US009150076B2

(12) United States Patent
Coombs et al.

(10) Patent No.: US 9,150,076 B2
(45) Date of Patent: *Oct. 6, 2015

(54) SUSPENSION STRUT FOR A VEHICLE
(71) Applicant: Fluid Ride, Ltd., East Lansing, MI (US)
(72) Inventors: Joshua Coombs, East Lansing, MI (US); Jeremy Edmondson, Hillsborough, NC (US)
(73) Assignee: Fluid Ride, Ltd., East Lansing, MI (US)
(*) Notice: Subject to any disclaimer, the term of this patent is extended or adjusted under 35 U.S.C. 154(b) by 0 days.

This patent is subject to a terminal disclaimer.

(21) Appl. No.: 14/029,139
(22) Filed: Sep. 17, 2013
(65) Prior Publication Data US 2014/0203530 A1 Jul. 24, 2014

Related U.S. Application Data

(63) Continuation of application No. 13/176,720, filed on Jul. 5, 2011, now Pat. No. 8,534,687.
(60) Provisional application No. 61/361,493, filed on Jul. 5, 2010, provisional application No. 61/423,573, filed on Dec. 15, 2010.

(51) Int. Cl.
*B60G 13/08* (2006.01)
*B60G 17/08* (2006.01)
(Continued)

(52) U.S. Cl.
CPC ............... *B60G 17/08* (2013.01); *B60G 13/08* (2013.01); *F16F 9/064* (2013.01); *F16F 9/066* (2013.01);
(Continued)

(58) Field of Classification Search
CPC .. B60G 13/08; B60G 17/015; B60G 17/0152; B60G 17/04; B60G 17/056; B60G 17/08; B60G 2202/15; B60G 2202/24; B60G 2500/11; B60G 2500/114; B60G 2300/60; F16F 9/18; F16F 9/3207; F16F 9/3214; F16F 9/3235; F16F 9/325; F16F 9/3257; F16F 9/34; F16F 9/3405; F16F 9/346; F16F 9/50; F16F 9/512; F16F 9/516; F16F 9/5165; F16F 9/064; F16F 9/066; F16F 9/43; F16F 9/46

USPC ............... 188/266.2–266.6, 314, 315, 282.1, 188/282.2; 280/5.512, 5.515, 124.145, 280/124.146, 124.154, 124.157, 124.16, 280/124.161

See application file for complete search history.

(56) References Cited

U.S. PATENT DOCUMENTS 2,070,440 A 2/1937 Maddin
2,828,960 A 4/1958 Rene et al.
(Continued)

FOREIGN PATENT DOCUMENTS

EP 0279507 A 8/1988
EP 0427046 A 5/1991
(Continued)

OTHER PUBLICATIONS

Ikenaga et al., "Active Suspension Control Using a Novel Strut and Active Filtered Feedback Design and Implementation," Proc. 1999 IEEE International Conference on Control Applications, Kohala Coast-Island of Hawaii, Hawaii, Aug. 22-27, 1999, pp. 1502-1508.

*Primary Examiner* — Laura Freedman
(74) *Attorney, Agent, or Firm* — Jeffrey Schox; Diana Lin

(57) ABSTRACT

A hydraulic strut system that damps vehicle vibration and includes a compressible fluid, a strut, and a valve plate. The strut includes three concentric tubes defining an inner cavity, an intermediary cavity, and an outer reservoir cavity, the inner cavity and intermediary cavity being fluidly coupled, wherein the inner cavity receives a piston that divides the inner cavity into a first volume and a second volume, the piston having an aperture that allows one way flow from the first volume to the second volume. The valve plate is removably coupled to the strut, and includes a first fluid path that allows one-way fluid flow from the intermediary cavity to the reservoir cavity, the first fluid path including a damping valve that damps fluid flowing therethrough; and a second fluid path that allows one-way fluid flow from the reservoir cavity to the inner cavity, the second fluid path further including a replenishment valve.

19 Claims, 18 Drawing Sheets

(51) Int. Cl.
  *F16F 9/18* (2006.01)
  *F16F 9/516* (2006.01)
  *F16F 9/06* (2006.01)
  *F16F 9/32* (2006.01)
  *F16F 9/43* (2006.01)
  *F16F 9/46* (2006.01)
  *F16F 9/50* (2006.01)

(52) U.S. Cl.
  CPC ............. *F16F 9/18* (2013.01); *F16F 9/3207* (2013.01); *F16F 9/43* (2013.01); *F16F 9/46* (2013.01); *F16F 9/50* (2013.01); *F16F 9/5165* (2013.01); *B60G 2300/60* (2013.01)

(56) References Cited

U.S. PATENT DOCUMENTS

| | | | |
|---|---|---|---|
| 2,946,582 | A | 7/1960 | Martin |
| 3,031,853 | A | 5/1962 | Olson |
| 3,149,830 | A | 9/1964 | Broadwell |
| 3,154,317 | A | 10/1964 | Varne Gustafsson |
| 3,156,251 | A | 11/1964 | Edmond |
| 3,559,776 | A * | 2/1971 | Schultze ............... 188/300 |
| 3,582,106 | A | 6/1971 | Keijzer |
| 3,603,576 | A | 9/1971 | Hahn |
| 3,627,348 | A | 12/1971 | Klees |
| 3,653,676 | A | 4/1972 | Higginbotham |
| 3,696,710 | A | 10/1972 | Ortelli |
| 3,709,517 | A | 1/1973 | Wossner |
| 3,717,355 | A | 2/1973 | De |
| 3,871,635 | A | 3/1975 | Unruh et al. |
| 3,875,851 | A | 4/1975 | Foster |
| 3,885,809 | A | 5/1975 | Pitcher |
| 3,895,816 | A | 7/1975 | Takahashi et al. |
| 3,895,820 | A | 7/1975 | Takahashi et al. |
| 3,940,163 | A | 2/1976 | Davis et al. |
| 3,945,664 | A | 3/1976 | Hiruma |
| 3,947,004 | A | 3/1976 | Taylor |
| 3,961,336 | A | 6/1976 | Walker et al. |
| 4,070,950 | A | 1/1978 | Cyphelly |
| 4,145,073 | A | 3/1979 | Mcluckie et al. |
| 4,298,318 | A | 11/1981 | Tsuchiya et al. |
| 4,306,638 | A | 12/1981 | Malott |
| 4,371,317 | A | 2/1983 | Heibel |
| 4,389,045 | A | 6/1983 | Taylor |
| 4,411,447 | A | 10/1983 | Hart |
| 4,441,593 | A | 4/1984 | Axthammer |
| 4,556,718 | A | 12/1985 | Chastrette et al. |
| 4,558,767 | A | 12/1985 | Taylor |
| 4,589,678 | A | 5/1986 | Lund |
| 4,607,861 | A | 8/1986 | Eisenberg et al. |
| 4,634,143 | A | 1/1987 | Asami et al. |
| 4,643,437 | A | 2/1987 | Salant et al. |
| 4,652,008 | A | 3/1987 | Davis |
| 4,659,106 | A | 4/1987 | Fujita et al. |
| 4,691,276 | A | 9/1987 | Miller et al. |
| 4,696,489 | A | 9/1987 | Fujishiro et al. |
| 4,718,648 | A | 1/1988 | Taylor |
| 4,729,459 | A | 3/1988 | Inagaki et al. |
| 4,735,402 | A | 4/1988 | Davis |
| 4,741,416 | A | 5/1988 | Tanigawa |
| 4,741,516 | A | 5/1988 | Davis |
| 4,752,062 | A | 6/1988 | Domenichini |
| 4,768,627 | A | 9/1988 | Taylor |
| 4,809,179 | A | 2/1989 | Klinger et al. |
| 4,819,772 | A * | 4/1989 | Rubel ............... 188/267.1 |
| 4,828,230 | A | 5/1989 | Steger et al. |
| 4,867,286 | A | 9/1989 | Taylor |
| 4,872,702 | A | 10/1989 | Medley |
| 4,877,222 | A | 10/1989 | Davis |
| 4,880,086 | A | 11/1989 | Knecht et al. |
| 4,881,753 | A | 11/1989 | Shima et al. |
| 4,888,696 | A | 12/1989 | Akatsu et al. |
| 5,011,180 | A | 4/1991 | Dunwoody |
| 5,014,829 | A | 5/1991 | Hare, Sr. |
| 5,020,826 | A | 6/1991 | Stecklein et al. |
| 5,029,328 | A | 7/1991 | Kamimura et al. |
| 5,033,770 | A | 7/1991 | Kamimura et al. |
| 5,043,893 | A | 8/1991 | Aburaya et al. |
| 5,049,039 | A | 9/1991 | Knoth et al. |
| 5,054,808 | A | 10/1991 | Tsukamoto |
| 5,062,658 | A | 11/1991 | Majeed |
| 5,070,970 | A | 12/1991 | Johnston et al. |
| 5,071,157 | A | 12/1991 | Majeed |
| 5,071,158 | A | 12/1991 | Yonekawa et al. |
| 5,080,392 | A | 1/1992 | Bazergui |
| 5,082,308 | A | 1/1992 | Jones |
| 5,098,119 | A | 3/1992 | Williams et al. |
| 5,103,396 | A | 4/1992 | Hiwatashi et al. |
| 5,103,397 | A | 4/1992 | Ikemoto et al. |
| 5,104,143 | A | 4/1992 | Yonekawa |
| 5,105,358 | A | 4/1992 | Takase et al. |
| 5,105,918 | A | 4/1992 | Hagiwara et al. |
| 5,113,345 | A | 5/1992 | Mine et al. |
| 5,119,297 | A | 6/1992 | Buma et al. |
| 5,130,926 | A | 7/1992 | Watanabe et al. |
| 5,137,299 | A | 8/1992 | Jones |
| 5,144,559 | A | 9/1992 | Kamimura et al. |
| 5,152,547 | A | 10/1992 | Davis |
| 5,156,645 | A | 10/1992 | Tsukamoto et al. |
| 5,162,995 | A | 11/1992 | Ikemoto et al. |
| 5,163,538 | A * | 11/1992 | Derr et al. ............... 188/318 |
| 5,163,706 | A | 11/1992 | Maguran, Jr. et al. |
| 5,174,598 | A | 12/1992 | Sato et al. |
| 5,177,681 | A | 1/1993 | Sato |
| 5,190,446 | A | 3/1993 | Salter et al. |
| 5,195,619 | A | 3/1993 | Dourson et al. |
| 5,208,749 | A | 5/1993 | Adachi et al. |
| 5,217,245 | A | 6/1993 | Guy |
| 5,231,583 | A | 7/1993 | Lizell |
| 5,234,203 | A | 8/1993 | Smith |
| 5,239,471 | A | 8/1993 | Takahashi |
| 5,246,235 | A | 9/1993 | Heinzen |
| 5,259,738 | A | 11/1993 | Salter et al. |
| 5,261,455 | A | 11/1993 | Takahashi et al. |
| 5,265,913 | A | 11/1993 | Scheffel |
| 5,269,556 | A | 12/1993 | Heyring |
| 5,277,281 | A | 1/1994 | Carlson et al. |
| 5,282,645 | A * | 2/1994 | Spakowski et al. ......... 188/266.6 |
| 5,282,649 | A | 2/1994 | Williams et al. |
| 5,295,563 | A | 3/1994 | Bennett |
| 5,301,412 | A | 4/1994 | Hahn et al. |
| 5,305,859 | A | 4/1994 | Davis |
| 5,316,272 | A | 5/1994 | Davis |
| 5,326,229 | A | 7/1994 | Collins |
| 5,335,757 | A | 8/1994 | Knecht et al. |
| 5,348,338 | A | 9/1994 | Kuriki et al. |
| 5,351,790 | A | 10/1994 | Machida |
| 5,423,402 | A | 6/1995 | De Kock |
| 5,472,070 | A * | 12/1995 | Feigel ............... 188/266.6 |
| 5,480,011 | A | 1/1996 | Nagai et al. |
| 5,486,018 | A | 1/1996 | Sakai |
| 5,522,481 | A | 6/1996 | Watanabe |
| 5,527,251 | A | 6/1996 | Davis |
| 5,536,036 | A | 7/1996 | Ehrlich |
| 5,540,448 | A | 7/1996 | Heinzen |
| 5,570,287 | A | 10/1996 | Campbell et al. |
| 5,572,425 | A | 11/1996 | Levitt et al. |
| 5,577,579 | A | 11/1996 | Derr |
| 5,584,498 | A | 12/1996 | Danek |
| 5,593,176 | A | 1/1997 | Campbell et al. |
| 5,595,372 | A | 1/1997 | Patten |
| 5,598,337 | A | 1/1997 | Butsuen et al. |
| 5,619,413 | A | 4/1997 | Oakley |
| 5,627,751 | A | 5/1997 | Davis et al. |
| 5,630,623 | A | 5/1997 | Ganzel |
| 5,632,502 | A | 5/1997 | Oppitz et al. |
| 5,671,142 | A | 9/1997 | Tatarazako |
| 5,679,187 | A | 10/1997 | Price |
| 5,684,698 | A | 11/1997 | Fujii et al. |
| 5,730,261 | A | 3/1998 | Spakowski et al. |
| 5,769,400 | A | 6/1998 | Hoelzl et al. |
| 5,788,028 | A | 8/1998 | Bieber |
| 5,878,851 | A | 3/1999 | Carlson et al. |

(56) References Cited

U.S. PATENT DOCUMENTS

| | | |
|---|---|---|
| 5,879,137 A | 3/1999 | Yie |
| 5,944,153 A | 8/1999 | Ichimaru |
| 5,979,501 A | 11/1999 | Kim et al. |
| 6,003,872 A | 12/1999 | Nord |
| 6,017,023 A | 1/2000 | Greuter et al. |
| 6,024,366 A | 2/2000 | Masamura |
| 6,032,090 A | 2/2000 | Von Bose |
| 6,095,541 A | 8/2000 | Turner et al. |
| 6,105,987 A | 8/2000 | Turner |
| 6,119,829 A | 9/2000 | Nakadate |
| 6,120,009 A | 9/2000 | Gatehouse et al. |
| 6,142,477 A | 11/2000 | Meinzer |
| 6,145,859 A | 11/2000 | Altherr et al. |
| 6,155,391 A | 12/2000 | Kashiwagi et al. |
| 6,202,010 B1 | 3/2001 | Shono et al. |
| 6,216,831 B1 | 4/2001 | Taylor |
| 6,217,010 B1 | 4/2001 | McNeely |
| 6,227,167 B1 | 5/2001 | Smith et al. |
| 6,234,500 B1 | 5/2001 | Aufrance |
| 6,247,683 B1 | 6/2001 | Hayakawa et al. |
| 6,250,658 B1 | 6/2001 | Sakai |
| 6,259,982 B1 | 7/2001 | Williams et al. |
| 6,264,212 B1 | 7/2001 | Timoney |
| 6,267,387 B1 | 7/2001 | Weiss |
| 6,282,470 B1 | 8/2001 | Shono et al. |
| 6,293,530 B1 | 9/2001 | Delorenzis et al. |
| 6,305,272 B1 | 10/2001 | Lin |
| 6,305,673 B1 | 10/2001 | Delorenzis et al. |
| 6,318,521 B1 | 11/2001 | Niaura et al. |
| 6,318,737 B1 | 11/2001 | Marechal et al. |
| 6,321,888 B1 | 11/2001 | Reybrouck et al. |
| 6,328,125 B1 | 12/2001 | Van Den et al. |
| 6,361,033 B1 | 3/2002 | Jones et al. |
| 6,389,341 B1 | 5/2002 | Davis |
| 6,394,238 B1 | 5/2002 | Rogala |
| 6,397,134 B1 | 5/2002 | Shal et al. |
| 6,402,128 B1 | 6/2002 | Trowbridge |
| 6,416,061 B1 | 7/2002 | French et al. |
| 6,418,363 B2 | 7/2002 | Cochofel et al. |
| 6,470,248 B2 | 10/2002 | Shank et al. |
| 6,486,018 B2 | 11/2002 | Roberts et al. |
| 6,513,797 B2 | 2/2003 | Sawai |
| 6,517,094 B1 | 2/2003 | Kincaid et al. |
| 6,523,845 B2 | 2/2003 | Stiller |
| 6,556,907 B1 | 4/2003 | Sakai |
| 6,598,885 B2 | 7/2003 | Delorenzis et al. |
| 6,679,504 B2 | 1/2004 | Delorenzis et al. |
| 6,811,167 B2 | 11/2004 | Coombs et al. |
| 6,811,168 B2 | 11/2004 | Acker et al. |
| 6,811,171 B2 | 11/2004 | Sakai |
| 6,814,364 B2 | 11/2004 | Coombs et al. |
| 6,871,866 B2 | 3/2005 | Gloceri et al. |
| 6,886,841 B2 | 5/2005 | Coombs et al. |
| 6,978,871 B2 | 12/2005 | Holiviers |
| 7,413,063 B1 | 8/2008 | Davis |
| 7,438,164 B2 | 10/2008 | Groves et al. |
| 7,441,640 B2 | 10/2008 | Russell |
| 7,472,914 B2 | 1/2009 | Anderson et al. |
| 7,478,708 B2 | 1/2009 | Bugaj |
| 7,641,181 B2 | 1/2010 | Delorenzis |
| 7,641,208 B1 | 1/2010 | Barron et al. |
| 7,707,378 B2 | 4/2010 | Ganesan et al. |
| 7,740,256 B2 | 6/2010 | Davis |
| 7,743,896 B2 | 6/2010 | Vanhees et al. |
| 7,770,701 B1 | 8/2010 | Davis |
| 7,770,902 B1 | 8/2010 | Davis |
| 7,926,632 B2 * | 4/2011 | Mangelschots et al. ... 188/266.6 |
| 7,950,506 B2 | 5/2011 | Nowaczyk |
| 8,534,687 B2 * | 9/2013 | Coombs et al. .......... 280/124.16 |
| 8,857,582 B2 * | 10/2014 | Murakami ............... 188/322.13 |
| 2002/0195789 A1 | 12/2002 | Coombs et al. |
| 2003/0075881 A1 | 4/2003 | Delorenzis et al. |
| 2003/0090080 A1 | 5/2003 | Trotter et al. |
| 2003/0132071 A1 | 7/2003 | Coombs et al. |
| 2004/0188897 A1 | 9/2004 | Edmondson et al. |
| 2005/0073125 A1 | 4/2005 | Coombs et al. |
| 2006/0039795 A1 | 2/2006 | Stein et al. |
| 2006/0118346 A1 | 6/2006 | Rampen et al. |
| 2007/0258832 A1 | 11/2007 | Caldwell et al. |
| 2008/0048405 A1 | 2/2008 | Delorenzis et al. |
| 2008/0111324 A1 | 5/2008 | Davis |
| 2008/0206073 A1 | 8/2008 | Caldwell et al. |
| 2008/0245322 A1 | 10/2008 | Stein et al. |
| 2008/0251331 A1 * | 10/2008 | Mangelschots et al. ... 188/266.6 |
| 2008/0258484 A1 | 10/2008 | Caldwell et al. |
| 2008/0275606 A1 | 11/2008 | Tarasinski et al. |
| 2008/0284118 A1 | 11/2008 | Venton-Walters et al. |
| 2010/0044978 A1 | 2/2010 | Delorenzis et al. |
| 2010/0193308 A1 | 8/2010 | Nowaczyk et al. |
| 2010/0326780 A1 | 12/2010 | Murakami |
| 2011/0202236 A1 | 8/2011 | Galasso et al. |
| 2012/0001399 A1 * | 1/2012 | Coombs et al. ........ 280/124.161 |
| 2012/0152671 A1 * | 6/2012 | Murakami ..................... 188/315 |

FOREIGN PATENT DOCUMENTS

| | | | |
|---|---|---|---|
| EP | 718496 A | 6/1996 | |
| GB | 2154700 A | 9/1985 | |
| GB | 2269437 A * | 2/1994 | ............... F16F 9/40 |
| JP | 2009255785 A | 11/2009 | |
| WO | WO 9322582 A1 * | 11/1993 | ............... F16F 9/46 |

* cited by examiner

SUSPENSION STRUT FOR A VEHICLE

CROSS-REFERENCE TO RELATED APPLICATIONS

This application is a continuation of co-pending U.S. patent application Ser. No. 13/176,720, filed 5 Jul. 2011, which claims the benefit of U.S. Provisional Application Nos. 61/361,493 filed 5 Jul. 2010 and 61/423,573 filed 15 Dec. 2010, all of which are both incorporated in their entirety by this reference. This application is related to U.S. Pat. Nos. 6,811,167 and 6,988,599, which are both incorporated in their entirety by this reference.

TECHNICAL FIELD

This invention relates generally to the damper field, and more specifically to an improved suspension strut in the vehicle suspension field.

BACKGROUND

There are a variety of dampers in automotive suspensions, including a mono-tube type strut, a twin-tube type strut, and a triple-tube type strut. Within each variation, there are variations with valve arrangement and fluid management. The triple-tube type strut construction includes tube and valve arrangement that allows for fluid flow within the strut that is generally in a single direction for both the compression and rebound direction of the suspension strut, whereas both mono-tube and twin-tube type struts require fluid to flow in different directions for the compression and rebound directions. This single-direction property of the triple-tube type strut allows for damping control of the fluid flow within the triple-tube type strut to be localized to one general area within the strut for both compression and rebound directions. As a result, conventional semi-active or continuously variable damping control systems typically utilize the triple-tube type strut and a single active solenoid valve to control damping force for both the compression and rebound directions of the strut.

Conventional triple-tube type strut dampers include many internal parts that function to tune the dampening properties of the strut and are, for this reason, quite complex. Additionally, the damping mechanisms that are utilized in such triple-tube type struts may leak, decreasing the efficiency of the damper, or may be relatively expensive. As shown in FIG. 1 (prior art), the active valve 10 in typical triple-tube type strut dampers is often mounted perpendicular to the long axis of the damper tube 12 and substantially adjacent to the base valve 14 that allows replenishment flow to the inner cavity 16 during the rebound stroke of the strut. This may allow such triple-tube type strut dampers to increase the range of travel of the suspension strut given a total strut height. However, this arrangement requires a fastening mechanism that does not benefit from the compressive forces from tube assembly and/or the vehicle. In semi-active or continuously variable damping control systems that utilize compressible fluids where the pressure within the suspension strut may increase to substantially high levels, the fastening mechanism used to mount the active valve perpendicularly to the axis of the damper tube may become substantially costly to withstand such high pressures. Because of complexity of typical triple-tube type strut dampers, cost is relatively high and adoption of such semi-active or continuously variable damping control systems in the field is substantially impaired.

Thus, there is a need in the vehicle suspension field to create an improved suspension strut. This invention provides such strut.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 2A:
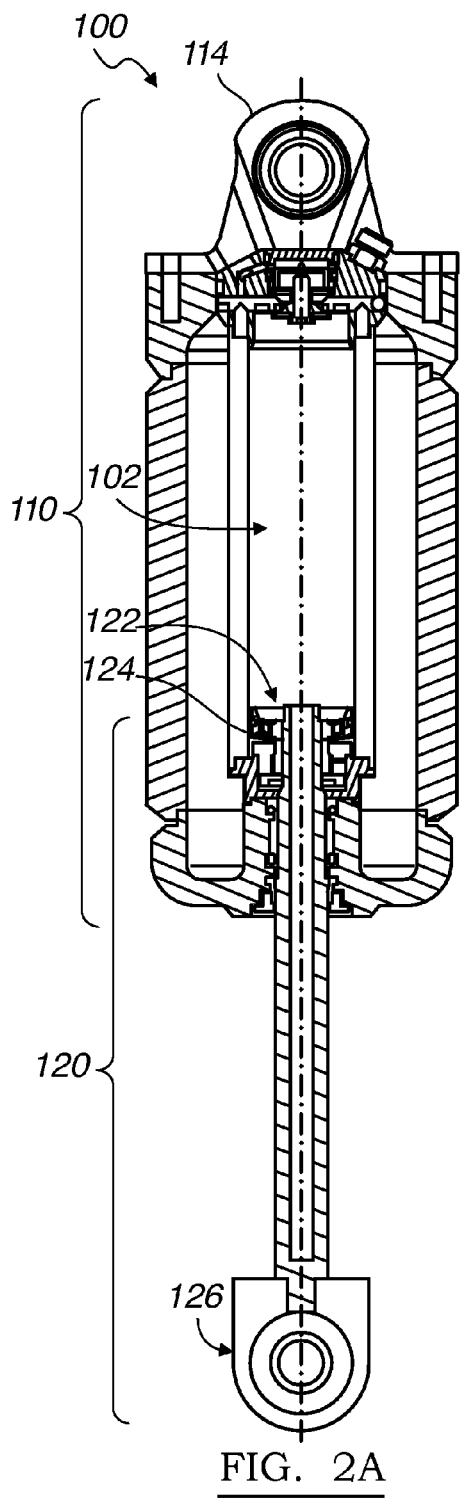
FIGS. 2A and 2B are schematic representations of the suspension strut of the preferred embodiments with the displacement rod and cavity piston displaced away from the valve plate and with the displacement rod and cavity piston displaced toward the valve plate, respectively.
Figure 2B:
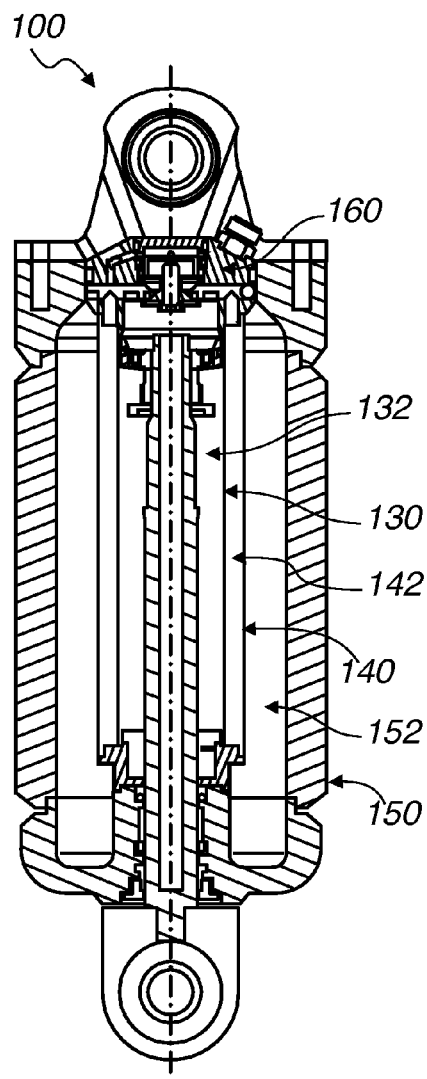
Figure 3A:
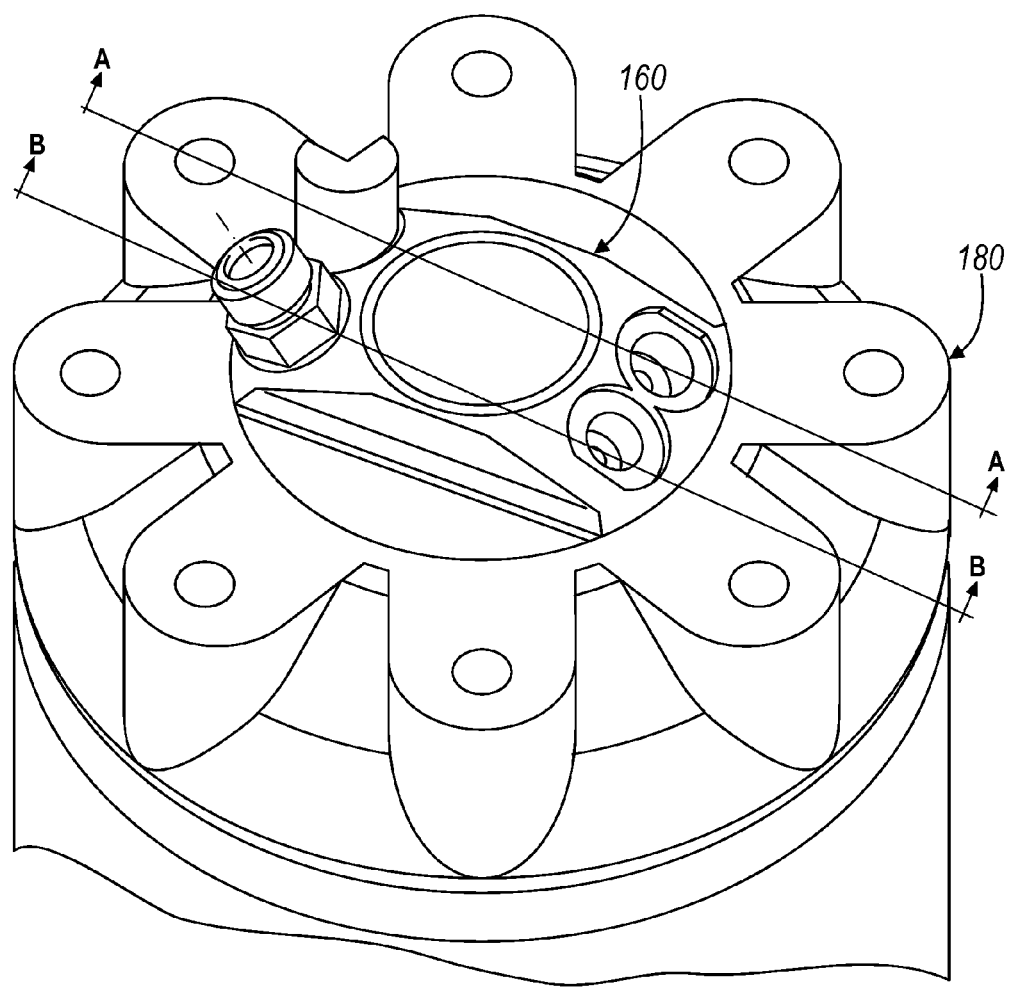
FIGS. 3A, 3B, and 3C are schematic representations of the valve plate with a passive damper valve in an orthogonal view, taken along Line A-A in FIG. 3A with the damping flow path, and taken along Line B-B in FIG. 3A with the replenishment flow path, respectively.
Figure 3B:
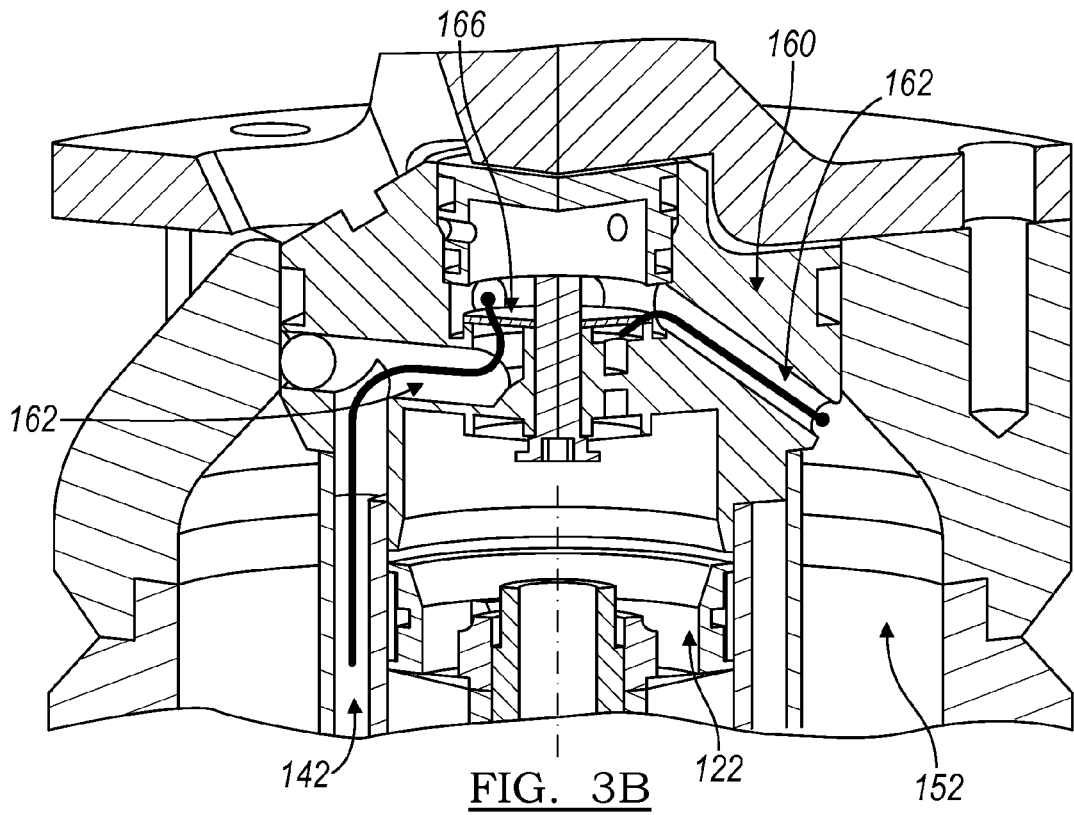
Figure 3C:
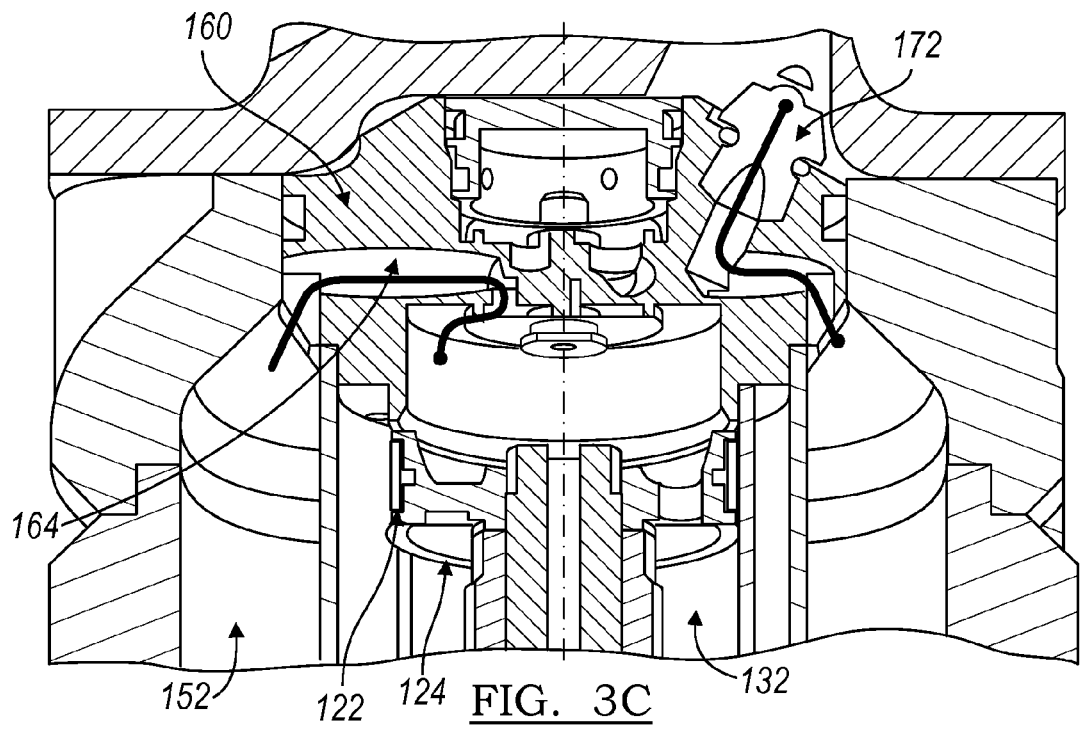

As shown in FIGS. 2 and 3, the suspension strut 100 of the preferred embodiments is preferably used with a vehicle having a wheel contacting a surface under the vehicle, such as the road, and preferably functions to suspend the wheel from the vehicle while allowing compression movement of the wheel toward the vehicle and rebound movement of the wheel toward the surface. The suspension strut 100 preferably includes a compressible fluid 102; a hydraulic tube 110 including an inner tube 130 that defines an inner cavity 132 that contains a portion of the compressible fluid 102, a secondary tube 140 that substantially envelopes the inner tube 130 and cooperates with the inner tube 130 to define an intermediary cavity 142 that contains another portion of the compressible fluid 102 and that accepts fluid flow from the inner cavity 132 through an inner flow path, and a housing tube 150 that substantially envelops the secondary tube 140 and cooperates with the secondary tube 140 to define a reservoir cavity 152 that contains another portion of the compressible fluid 102; a displacement rod 120; a cavity piston 122 coupled to the displacement rod 120 and extending into the hydraulic tube, thereby separating the inner cavity into a first volume 134 and a second volume 136, and that includes an aperture 124 that allows flow of fluid from the first volume 134 to the second volume 136 during the compression movement of the wheel; and a valve plate 160 coupled to the end of the hydraulic tube 110 opposite the displacement rod no that defines a first fluid path 162 from the intermediary cavity 142 to the reservoir cavity 152 (also referred to as "damping flow" path) and a second fluid path from the reservoir cavity 152 to the first volume 134 (also referred to as "replenishment flow" path), and includes a damper valve 166 that substantially affects the flow of fluid through the first fluid path 162. The valve plate 160 may also include an inlet/outlet valve 172 or a regeneration valve 170 that allows for additional fluid to enter the hydraulic strut 110 and/or extraneous fluid to exit the hydraulic strut 110 (for example, to increase or decrease, respectively, the suspending force provided by the suspension strut 100). The flow of fluid into and/or out of the hydraulic strut through the regeneration valve 170 and/or inlet/outlet valve 172 may be actively driven by one or more pumps, such as the digital displacement pump or motor as described in U.S. Pat. No. 5,259,738 entitled "Fluid Working Machine" and issued on 9 Nov. 1993, which is incorporated in its entirety by this reference, but may alternatively be any other suitable type of hydraulic pump.

In the preferred embodiments, the hydraulic tube 110 is coupled to the body of the vehicle and the displacement rod 120 is coupled to the wheel of the vehicle, which decreases the unsprung weight of the vehicle and may be beneficial in the dynamics of the vehicle. The hydraulic tube 110 and the displacement rod 120 preferably cooperate to translate forces felt by the wheel into a force substantially along the long axis of the suspension strut no. The hydraulic tube no preferably includes a vehicle interface 114 (shown in FIG. 2). Similarly, the displacement rod preferably includes a wheel interface 126. The vehicle interface 114 and the wheel interface 126 are preferably non-permanent attachment interfaces, for example, an eye that allows for a bolt to couple to the body of the vehicle or the wheel, screw holes to receive coupling screws, clips, Velcro, or any other suitable removable attachment mechanism. However the vehicle 114 and wheel interface 126 may alternatively be a substantially permanent attachment interface, for example, a welding joint. However, any other suitable interface type and arrangement of the suspension strut 100 relative to the vehicle may be used.

Figure 1:
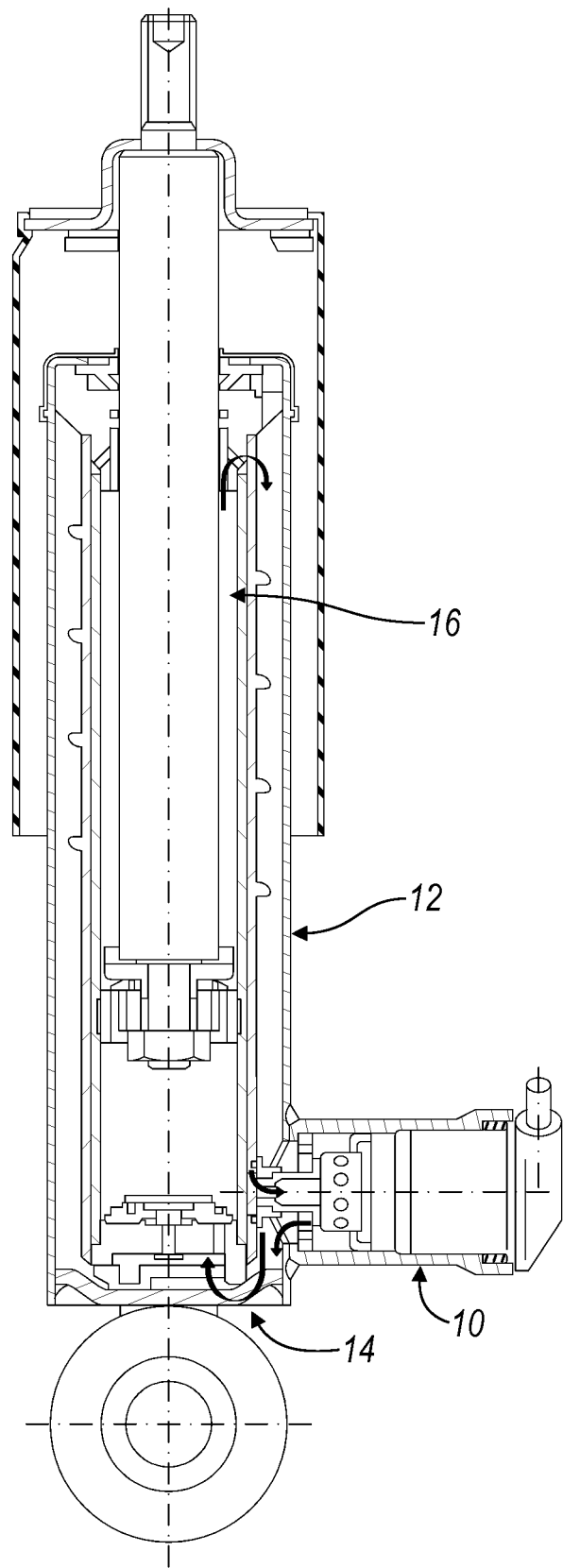
FIG. 1 is a schematic representation of a semi-active suspension strut of the prior art.

The suspension strut 100 of the preferred embodiments allows the base valve as seen in typical struts to also function to dampen the fluid flow within the strut, and functions to combine the dampening mechanism (the damper valve 166) and the base valve into the valve plate 160. This provides a substantially more compact and relatively simple construction as compared to the prior art (shown in FIG. 1). When desired, a valve plate 160 of any particular valve plate is preferably replaceable with another valve plate 160. For example, if a first valve plate 160 malfunctions, a second valve plate 160 may be swapped in to replace the first valve plate 160 to restore function of the suspension strut 100. Similarly, because most of the fluid control is contained within the valve plate 160, the fluid flow within the strut may be adjusted by using different types of valve plates 160 without any substantial change to other components of the suspension strut 100. For example, a first valve plate 160 with a first set of fluid flow control and characteristics may be replaced with a second valve plate 160 with a second set of fluid flow control and characteristics relatively easily. Additionally, by placing most of the fluid control within a removable valve plate 160, the suspension strut 100 may be easily updated with alternative valve plates 160 that provide additional and/or other functions as the application of the strut 100 changes and/or as valve plate 160 designs change. For example, a first valve plate 160 with a passively actuated damper valve 166 may be swapped with a second valve plate 160 with an active damper valve 166, changing the strut 100 from a passive suspension strut to a semi-active suspension strut. This feature may substantially increase the versatility and adaptability of the suspension strut 100 by allowing the same suspension strut 100 to be repeatedly used even as applications (or even conditions) may change.

The compressible fluid 102 the preferred embodiments functions to supply the suspending spring force hydraulic suspension strut. The compressible fluid 102 is preferably a silicone fluid that compresses about 1.5% volume at 2,000 psi, about 3% volume at 5,000 psi, and about 6% volume at 10,000 psi. Above 2,000 psi, the compressible fluid has a larger compressibility than conventional hydraulic oil. The compressible fluid, however, may alternatively be any suitable fluid, with or without a silicon component that provides a larger compressibility above 2,000 psi than conventional hydraulic oil.

Figure 4:
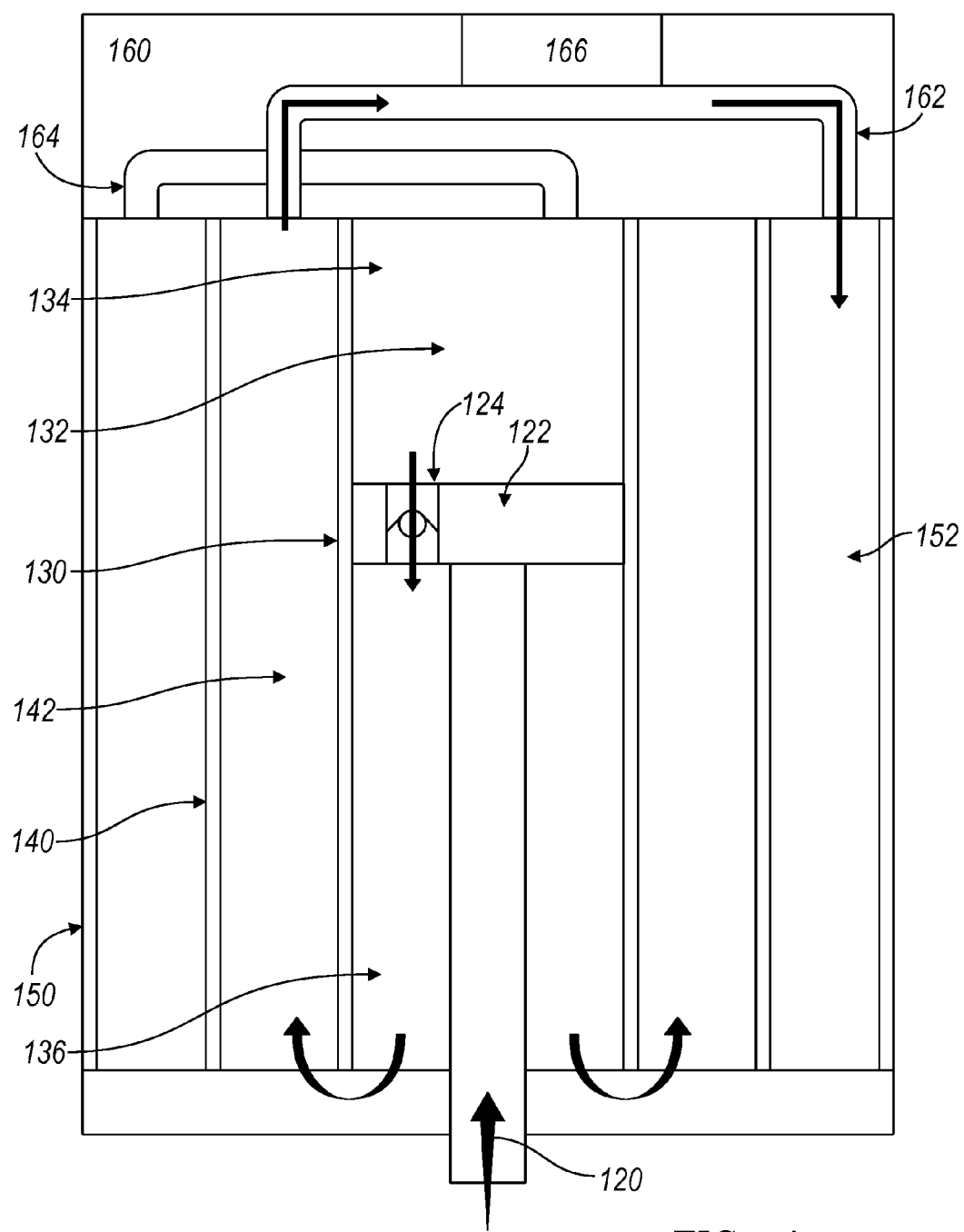
FIG. 4 is a schematic representation of flow during the compression stroke.
Figure 5A:
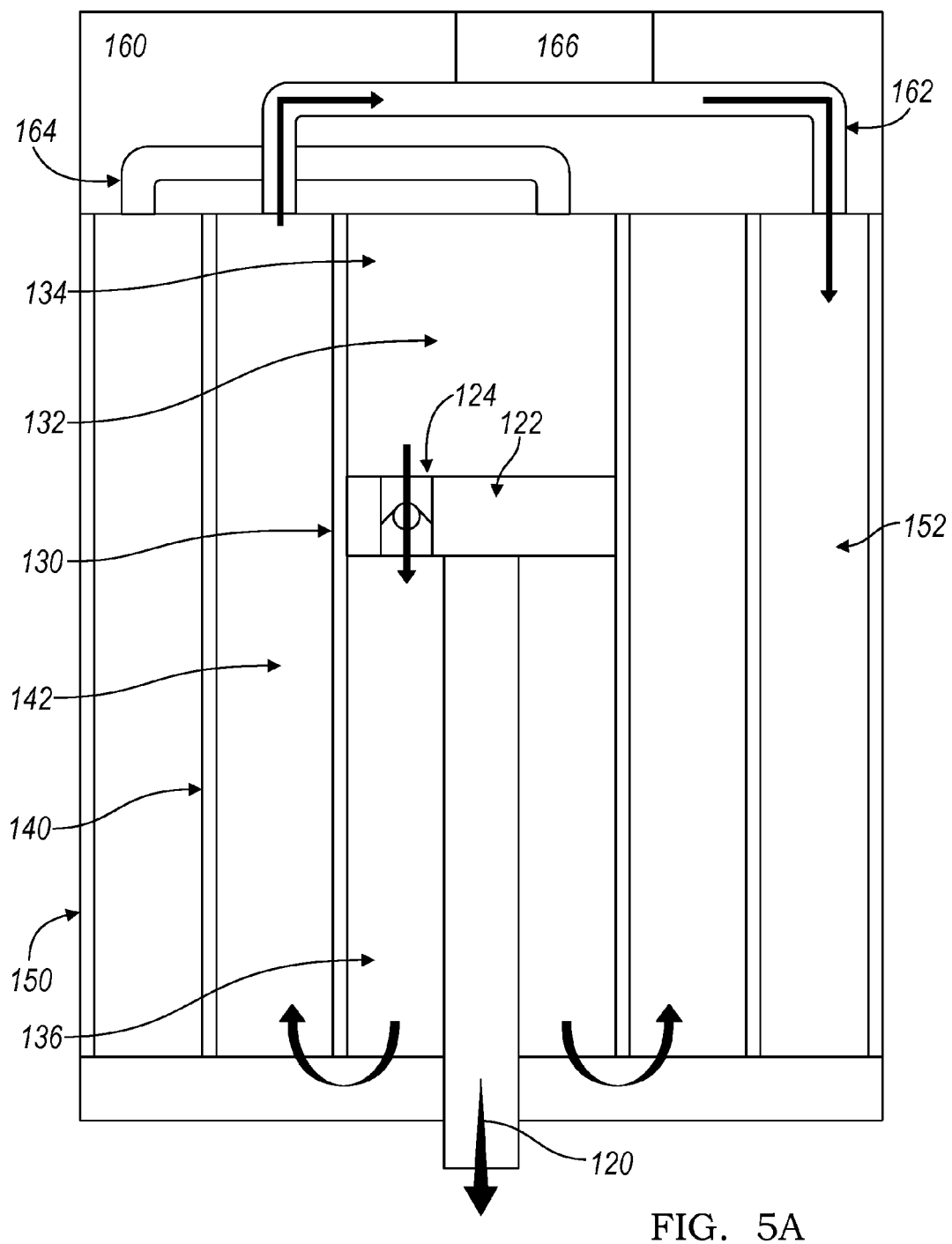
FIGS. 5A and 5B are schematic representations of flow during the rebound stroke of the outflow from the pressure chamber and the rebound flow into the interior cavity, respectively.
Figure 5B:
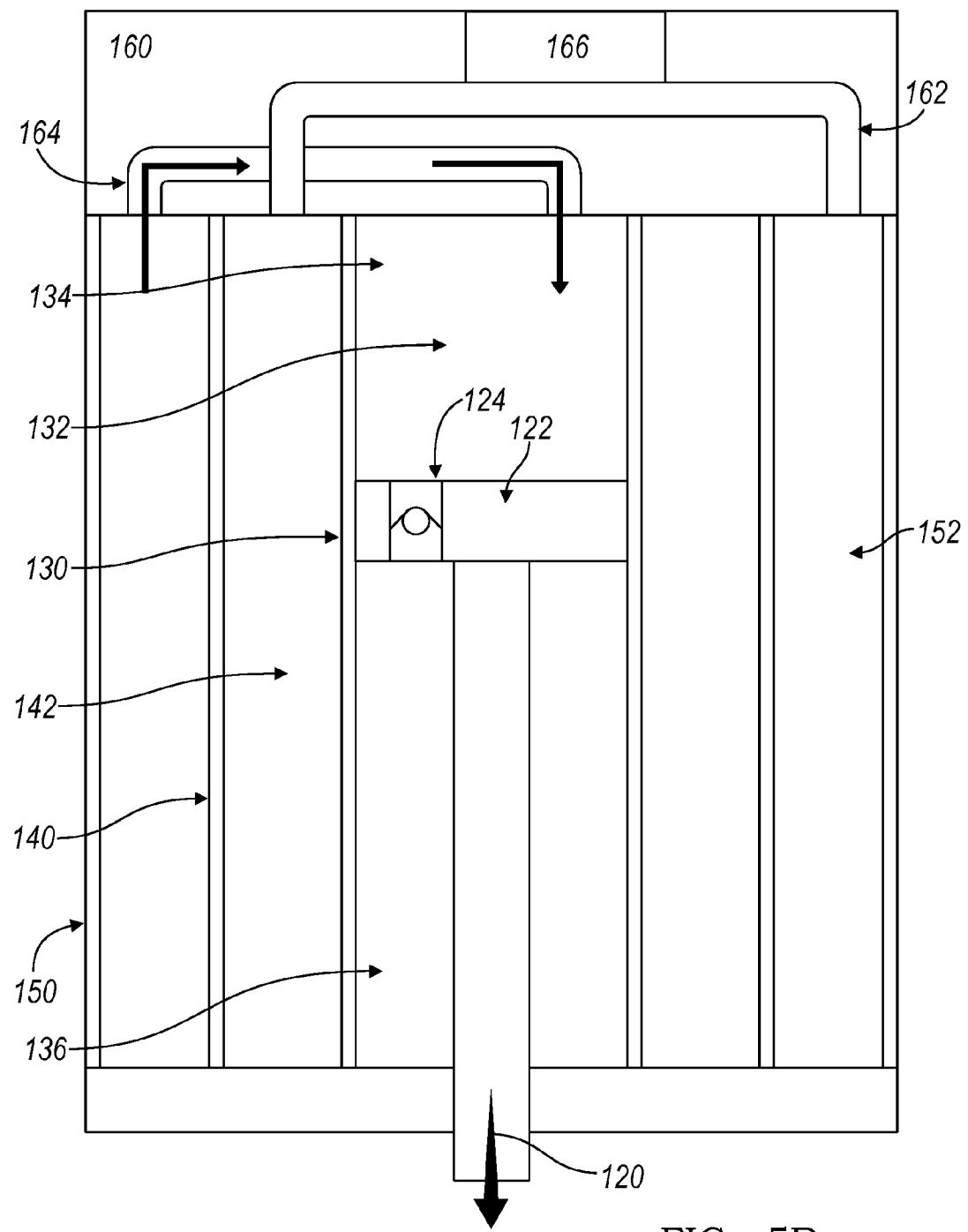

The hydraulic tube 110 the preferred embodiments functions to contain compressible fluid 102 to provide damping force as the displacement rod 120 and the cavity piston 122 is displaced towards (compression stroke) and away from (rebound stroke) the valve plate 160 as the wheel of the vehicle experiences irregularities in the road, for example, as the vehicle turns or encounters bumps. The hydraulic tube 110 is preferably of a triple-tube construction that allows for substantially single-directional flow within the hydraulic tube 110 during both compression and rebound strokes, as shown in FIG. 4 and FIG. 5, respectively. As shown in FIG. 4, during the compression stroke, the displacement rod 120 and cavity piston 122 are displaced toward the valve plate 160. Thus, fluid 102 flows from the first volume 134 of the internal cavity to the second volume 136 through the aperture 124 of the cavity piston 122. Because of the displacement rod 120 that is coupled to the cavity piston 122 and occupies a portion of the volume of the second volume 136, a portion of the fluid 102 is displaced into the intermediary cavity 142 from the internal cavity 132 through an inner flow path. The inner flow path fluidly couples the intermediary cavity 142 to the internal cavity 132 near or below the lowest stroke point of the cavity piston 122, and is preferably a valve in a second valve plate, but may alternately be an aperture through the inner tube wall, connection tubing or any other fluid connection. From the intermediary cavity 142, the fluid flows through the first fluid path 162 of the valve plate 160 to the reservoir cavity 152. As the fluid 102 flows through the first fluid path 162, the fluid 102 flows through damper valve 166, which provides a damping force to the fluid 102 and, subsequently, to the suspension strut 100. As shown in FIG. 5A, during the rebound stroke, the displacement rod 120 and cavity piston 122 are displaced away from the valve plate 160. The aperture 124 preferably includes an aperture valve that is preferably a one-direction valve, fluid flow from the first volume 134 into the second volume 136 is permitted and flow from the second volume 136 into the first volume 134 is prevented. Thus, as the second volume 136 is decreased during the rebound stroke, fluid 102 is displaced from the second volume 136 into the intermediary cavity 142 (as fluid flow into the first volume 134 is prevented by the aperture valve), and follows a path substantially identical to the one described above for the compression stroke. Concurrently, the volume of the first volume 134 increases as the displacement rod 120 and cavity piston 122 are displaced away from the valve plate 160. To prevent aeration, fluid 102 is directed into the first volume 134 to replenish the fluid contained in the internal cavity 132, as shown in FIG. 5B, and fluid 102 from the reservoir cavity 152 is directed through the second fluid path 164 of the valve plate 160 into the internal cavity 132. The valve plate 160 preferably includes a replenishment valve coupled to the second fluid path 164 that is preferably a one directional valve that opens when the pressure in the first volume is decreased as a result of the rebound stroke. Both the aperture valve and the replenishment valve preferably do not increase the pressure of the fluid flowing through, and preferably allow both sides of the valve to become substantially equal pressure when the valve is opened. For example, the aperture valve and the replenishment valve may each be a check valve that allows substantially unhindered flow in one direction and prevents flow in an opposite direction. The aperture valve and the replenishment valve may alternatively be a butterfly valve, a ball valve, a diaphragm valve, a needle valve, or any other valve, and may be either passive or active. However, the aperture valve and replenishment valve may be of any other suitable type and arrangement.

The housing tube 150, secondary tube 140, and internal tube 130 are preferably steel tubes that withstand the pressure provided by the compressible fluid during either a compression or rebound stroke. In the suspension strut 100 of the preferred embodiments, the fluid control is mostly contained within the valve plate 160. This substantially decouples fluid control from the housing, secondary, and internal tubes and allows for the housing, secondary, and internal tubes to be optimized as pressure vessels that better withstand the pressures that may be present in a compressible fluid strut system. Because each vehicle (or "application") may require different characteristics from the suspension strut 100, the geometry of each of the housing, secondary, and internal tubes, may be tailored to each application. The housing, secondary, and internal tubes of any suitable geometry preferably include a valve plate interface that interfaces with the valve plate 160. The valve plate interface preferably allows for the valve plate 160 to couple to any suitable geometry of the housing, secondary, and internal tubes. The valve plate interface may include a first end that is customized for a specific geometry of housing, secondary, and internal tubes and a second end that is adapted to the geometry of the valve plate 160. Alternatively, the valve plate interface may be formed into the housing, secondary, and internal tubes. For example, the housing, secondary, and internal tubes may each be a desired geometry for a substantial portion of the hydraulic tube no and taper into diameters that accommodate for a valve plate 160. However, the valve plate interface may be any other suitable arrangement.

As described above, the valve plate 160 functions to provide most of the fluid control within the suspension strut 100. The valve plate 160 preferably defines a first fluid path 162 from the intermediary cavity 142 to the reservoir cavity 152 (also referred to as "damping flow" path) and a second fluid path from the reservoir cavity 152 to the first portion of the inner cavity 132 (also referred to as "replenishment flow" path), and includes a damper valve 166 that substantially affects the flow of fluid through the first fluid path 162. The valve plate 160 is preferably mounted to the end of the hydraulic tube 110 opposite of the displacement rod, as shown in FIGS. 2 and 3, but may alternatively be arranged in any other suitable location. As shown in FIGS. 2A, 2B, and 3A, the valve plate 160 is preferably clamped onto the housing, secondary, and inner tubes using a cap 180. The cap 180 may include a plurality of holes that receive bolts that function to apply pressure onto the cap 180 to clamp the valve plate 160 onto the tubes 150, 140, and 130. However, the valve plate 160 may be assembled to the hydraulic tube no using any other suitable mechanism or arrangement. The valve plate 160 may also include a sealant, such as o-rings, that substantially seal the interface between the valve plate 160 and the housing, secondary, and inner tubes to substantially prevent fluid leakage.

As shown in FIG. 3B, the valve plate 160 defines a first fluid path 162 between the intermediary cavity 142 and the reservoir cavity 152. A damper valve 166 is coupled to the first fluid path 162 to substantially affect the flow of fluid 102 through the first fluid path 162, providing the damping force on the fluid 102 and, subsequently, the suspension strut 100. The damper valve 166 is preferably a passive valve in a first variation, a manually actuated valve in a second variation, an active valve in a third variation, or a regenerative valve in a fourth variation.

In the first variation, the damper valve 166 is a passive valve. The passive damper valve 166 is preferably a one directional valve that allows fluid flow when the pressure difference between a first side (side closest to the intermediary cavity 142) and the second side (side closet to the reservoir cavity 152) is at a certain level. The damper valve 166 of the preferred embodiments is preferably a disc valve (or shim stack) where fluid deflects the disc valve in one direction when a certain pressure differential is reached between either side of the disc valve, opening the valve for fluid flow, and where the disc valve prevents fluid flow in the opposite direction. Disc valves, which are generally robust, reliable, and consistent, are often used in a damper valve. Because typical semi-active or continuously variable damping control systems require active damper valves, however, disc valves (which are generally passive damper valves) are typically not used in triple-tube type strut architectures. Further, because of the fluid flow paths in such systems, it is difficult-to-impossible to apply a disc valve within a conventional semi-active or continuously variable damping control systems that utilize the triple-tube type strut. The valve plate 160 of the preferred embodiments, however, allows for a disc valve to be used in a triple-tube type strut architecture by, as shown in FIG. 3B, defining a first fluid path 162 that directs fluid flow in a flow direction suitable for a disc valve from the intermediary cavity 142 and directs flow from the disc valve to the reservoir cavity 152. Additionally, as will be described later, the same disc valve may be converted into a manually actuated or active arrangement. However, the damper valve 166 of the first variation may be any other suitable type of passive damper valve, such as a check valve, a ball valve, check valve, or needle valve.

Figure 6A:
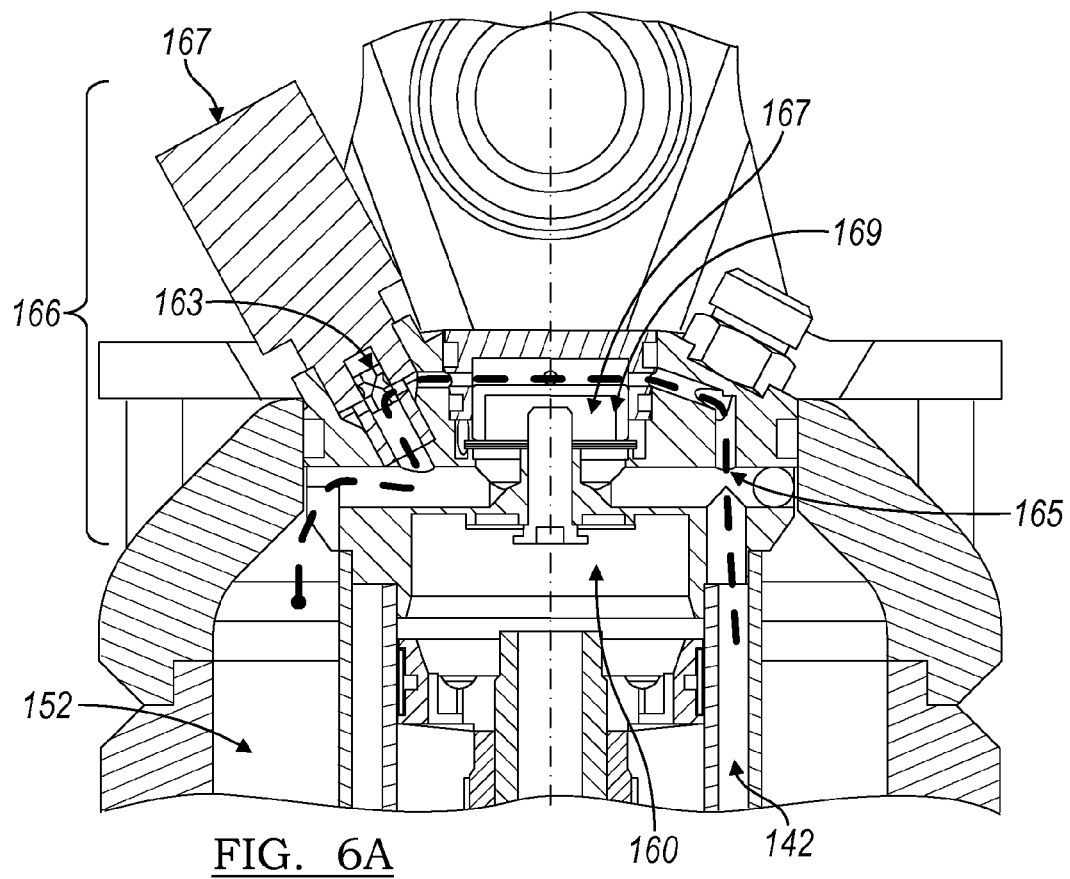
FIGS. 6A and 6B are schematic representations of the valve plate with a variation of an actuatable damper valve with decreased damping force and increased damping force, respectively.
Figure 6B:
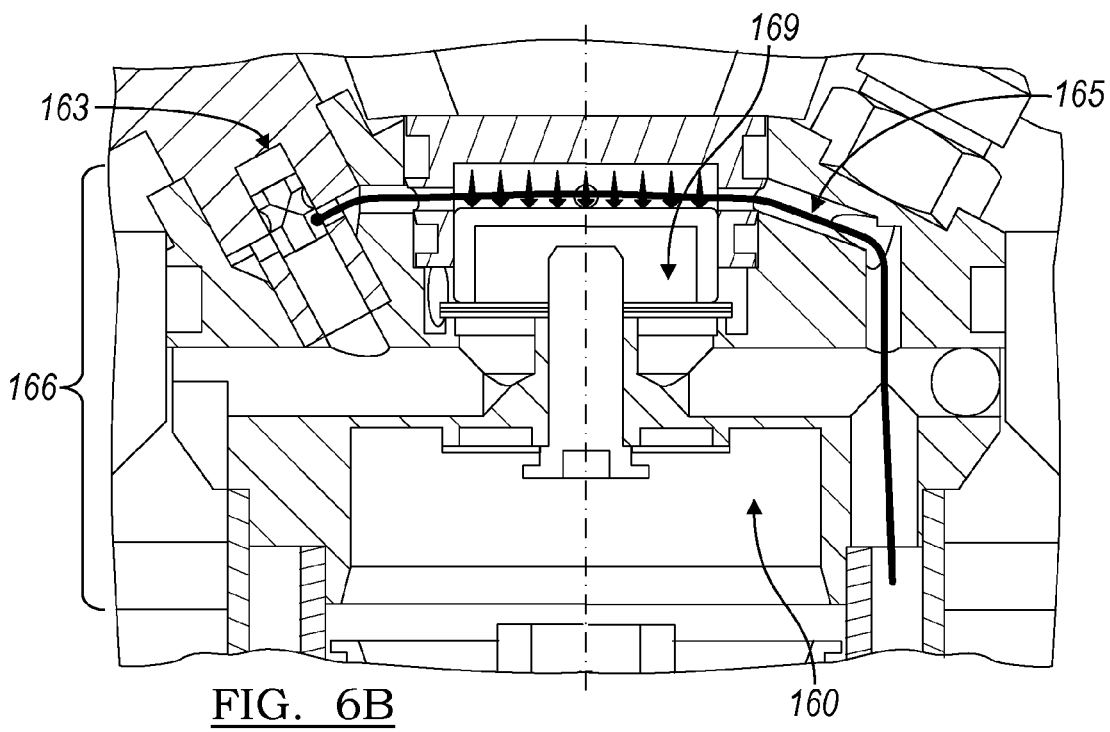

In the second variation, the damper valve 166 is a manually actuated valve. As an example, a technician may use the manually actuated valve damper valve 166 to adjust the damping characteristics of the suspension strut 100. The manually actuated damper valve 166 may be a bi-state valve that allows for a high damping force state and a low damping force state, but may alternatively be variable with a plurality of degrees of damping forces. As mentioned above, the disc valve exhibits damping properties that are desirable in a damper valve. Thus, the damper valve 166 of the second variation preferably includes a disc valve and an actuator 167, as shown in FIGS. 6A and 6B. The actuator 167 of the second variation of the damper valve 166 is preferably a manual actuator. The actuator 167 preferably includes a piston 169 that is arranged over the disc valve that functions to provide an adjustable pressure onto the disc valve to adjust the damping force provided by the disc valve. More specifically, because fluid flow must deflect the disc valve in order to flow through the valve, by applying a pressure onto the disc valve through the piston 169, the force necessary to deflect the disc valve increases, increasing the damping force on the fluid 102 flowing through the disc valve. In a first version of the actuator 167 of the manually actuated damper valve 166, the actuator 167 may include a screw coupled to the piston 169 that is accessible by a user. To adjust the damping force provided by the disc valve, a user may tighten the screw to push the piston 169 towards disc valve. In a second version of the manually actuated damper valve 166, the valve plate 160 may function to define a third fluid path 165 that directs fluid 102 from the intermediary cavity 142 to the reservoir cavity 152, as shown in FIGS. 6A and 6B. The third fluid path 165 preferably passes over the top of the piston 169, applying a fluid pressure across the top of the piston 169. Because damping force is preferably applied to the fluid 102 that flows from the intermediary cavity 142 to the reservoir cavity 152, a portion of the already existing flow between the intermediary cavity 142 and the reservoir cavity 152 may be relatively easily directed across the piston 169 when a damping force is desired. The actuator 167 of this variation preferably includes a fluid flow valve 163 that is manually actuated, for example, a needle valve, which is coupled to the third fluid path 165 downstream of the piston 169. By adjusting the rate of fluid flow through the third fluid path 165, the pressure provided by the fluid 102 onto the piston 169 may be adjusted. As shown in FIG. 6B, when the fluid valve 163 is closed, fluid flows into the third fluid path 165, but cannot flow into the reservoir cavity 152, resulting in increased fluid 102 pressure onto the piston 169, and subsequently, increased damping force provided by the damper valve 166. As shown in FIG. 6A, when the fluid valve 163 is open and fluid flows through the third fluid path 165 into the reservoir cavity 152, the pressure applied by the piston 169 is low, as the pressures in the first 134 and third 165 flow paths are substantially equivalent. However, the manually actuated damper valve 166 may be of any other suitable arrangement.

In the third variation, the damper valve 166 is an active valve, allowing the suspension strut 100 to function as a semi-active suspension strut. The active damper valve 166 may be a bi-state valve that allows for a high damping force state and a low damping force state, but may alternatively be variable with a plurality of degrees of damping forces. The active valve variation of the damper valve 166 is preferably used to provide substantially instantaneous adjustments of the damping force provided by the suspension strut 100, preferably during use in a vehicle while the vehicle is in motion, for an example, if a bump in the road is detected or if the vehicle makes a sudden turn. As mentioned above, the suspension strut 100 may also be used with an active control suspension system, which may function to actively change the suspending force provided by the suspension strut 100 by increasing or decreasing the amount of fluid 102 contained within the suspension strut 100. Vehicle dynamics may be controlled on more than one level by combining a semi-active suspension strut 100 with an active control suspension system, providing a vehicle that can substantially quickly adapt to a vast variety of driving conditions. The active damper valve 166 is substantially similar to the manual damper valve 166 as described above. The active damper valve 166 preferably also includes a disc valve and an actuator 167, as shown in FIGS. 6A and 6B. The actuator 167 of the third variation of the damper valve 166 is preferably an active actuator that may be electronically actuated, for example, by a processor or remotely by a user. The active actuator 167 preferably also includes a piston 169 that is arranged over the disc valve that functions to provide an adjustable pressure onto the disc valve to adjust the damping force provided by the disc valve. A first variation of the actuator 167 of the active damper valve 166 is substantially similar to the first variation of the actuator 167 of the manually actuated damper valve 166. The actuator 167 of the active damper valve 166 of the first variation includes a motor that is coupled to a screw that functions to raise or lower the piston 169 away from or towards the disc valve, adjusting the damping force provided by the disc valve. A second variation of the actuator 167 of the active damper valve 166 is substantially similar to the second variation of the actuator 167 of the manually actuated damper valve 166. The valve plate 160 functions to define a third fluid path 165 that directs fluid 102 from the intermediary cavity 142 to the reservoir cavity 152 to provide pressure across the top of the piston 169, thus adjusting the pressure provided by the piston onto the disc valve and adjusting the damping force provided by the disc valve. The actuator 167 of the active damper valve 166 of the second variation includes a fluid flow valve 163 that is active, for example, a pilot valve that is actuated by a solenoid or any other suitable type of actuated fluid valve, coupled to the third fluid flow path 165 downstream of the piston 169. The fluid flow valve 163 functions provide control of the fluid flow through the third fluid path 165 substantially identical to the manual fluid flow valve 163. In a third variation, the stiffness of the damper valve may be electronically controlled by using materials that exhibit different strain properties with the application of heat or electricity, or by using electromagnets. However, the active damper valve 166 may be of any other suitable arrangement.

Figure 7A:
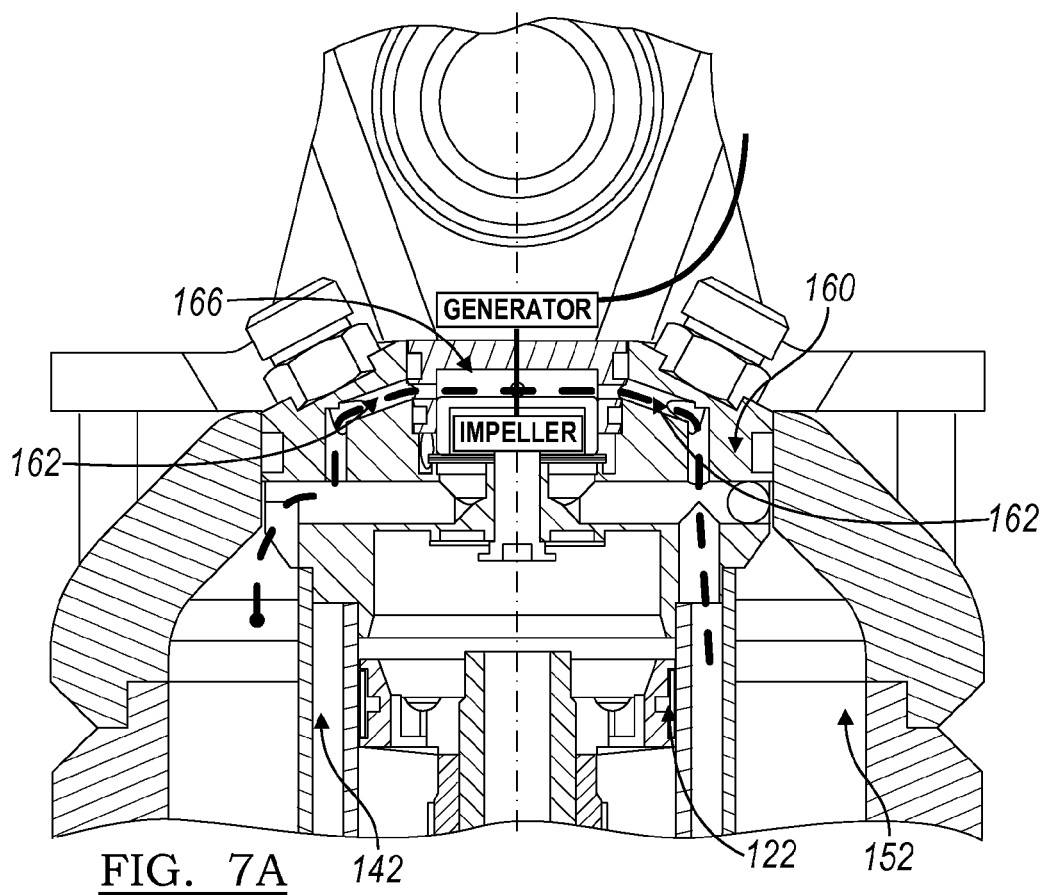
FIGS. 7A, 7B, and 7C are a schematic representation of the valve plate with a first, second, and third variation of a regenerative damper valve, respectively.
Figure 7B:
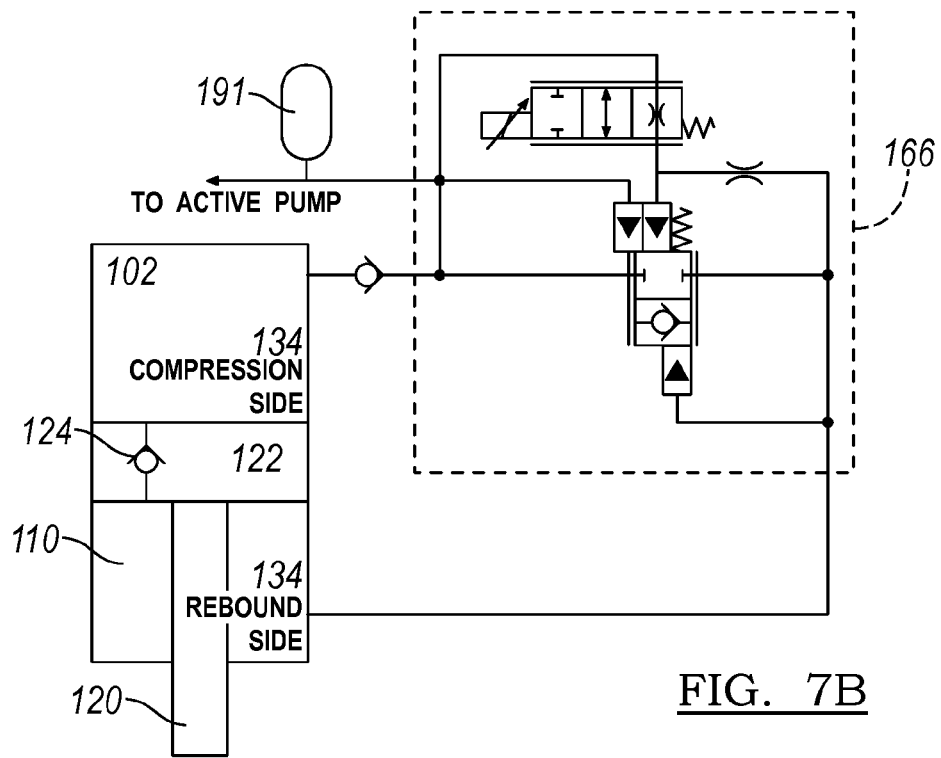
Figure 7C:
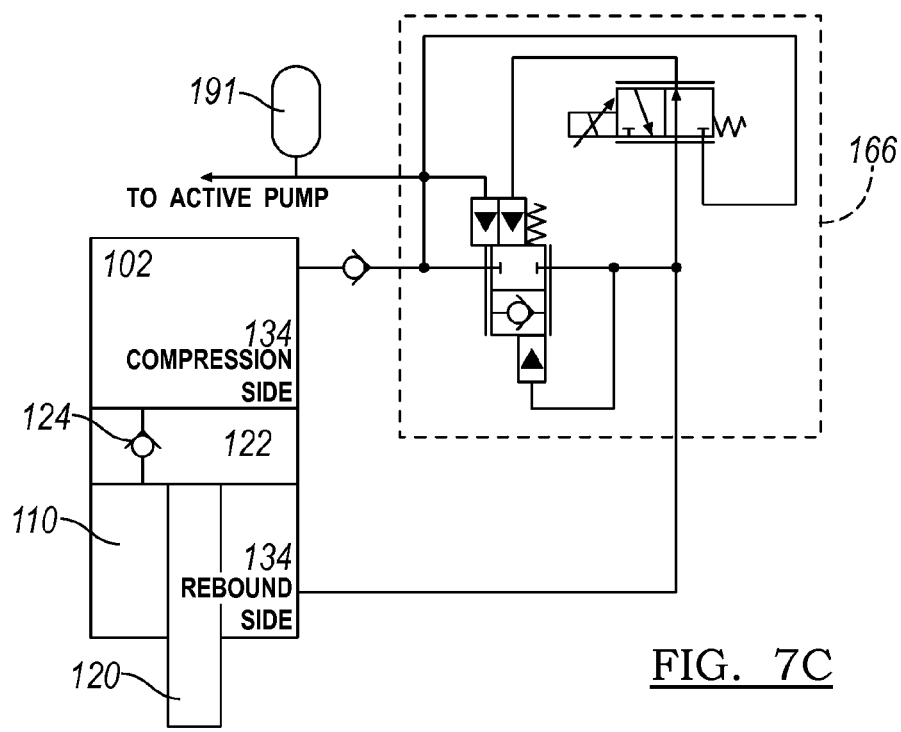

In the fourth variation, the damper valve 166 is a regenerative valve, as shown in FIG. 7. In this variation, the damper valve 166 may be either passive or active. As fluid flow is damped, a significant amount of energy is dissipated. In conventional dampers, the energy is dissipated as heat and substantially wasted. The damper valve 166 of the fourth variation, however, provides a method and means to harness the energy, in particular, to convert the energy into electrical energy. In a first example, shown in FIG. 7A, the damper valve 166 may include an impeller that is coupled to a motor. As fluid flows past the impeller, the impeller is caused to spin, and the energy used to spin the impeller is used to generate electricity in the generator. The fluid 102 is damped as a result because of the work used to spin the impeller. In the passive version of the damper valve 166 of the fourth variation, the work required to spin the impeller is substantially constant at all times. In the active version of the damper 166 of the fourth variation, increasing the electrical generation required from the generator may increase the work required to spin the impeller, increasing the damping of the fluid 102 (examples shown in FIGS. 7B and 7C). However, any other variation of a damper valve 166 that is regenerative may be used.

As described above, the first, second, and third variations (and potentially the fourth variation) all preferably utilize a similar construction that includes a disc valve. Because of this feature, it is conceivable that the same housing for the valve plate 160 may be used with different variations of the damper valve 166, allowing a valve plate 160 that was outfitted with a passive damper valve 166 to be upgraded to an active damper valve 166 with the same housing for the valve plate 160.

The valve plate 160 preferably includes one of the above variations of damper valve 166, but may alternatively include any number or suitable combinations of the above variations. For example, the regenerative damper valve 166 of the fourth variation may be combined with the passive damper valve 166 of the first variation. More specifically, the valve plate 160 of this variation may also include both an impeller/generator assembly and a disc valve that cooperate to provide two fluid flow paths in situations with substantially high volume of fluid flow that a regenerative valve alone may not be able to accommodate. Additionally, because the regenerative valve includes a substantial number of moving parts, the regenerative valve may fail and prevent fluid from flowing through. By allowing a second path for fluid flow, the suspension strut 100 may continue to function. However, the valve plate 160 may be any other suitable variation. As mentioned above, the suspension strut 100 of the preferred embodiments preferably allows for different valve plates 160 to be used with the same hydraulic tube body, meaning a suspension strut 100 that originally used a valve plate 160 with a damper valve 166 of the first variation may be exchanged with a valve plate 160 with a damper valve 166 of the second, third, or fourth variation, allowing the suspension strut 100 to function differently without substantial changes to any other component of the suspension strut 100.

Figure 8:
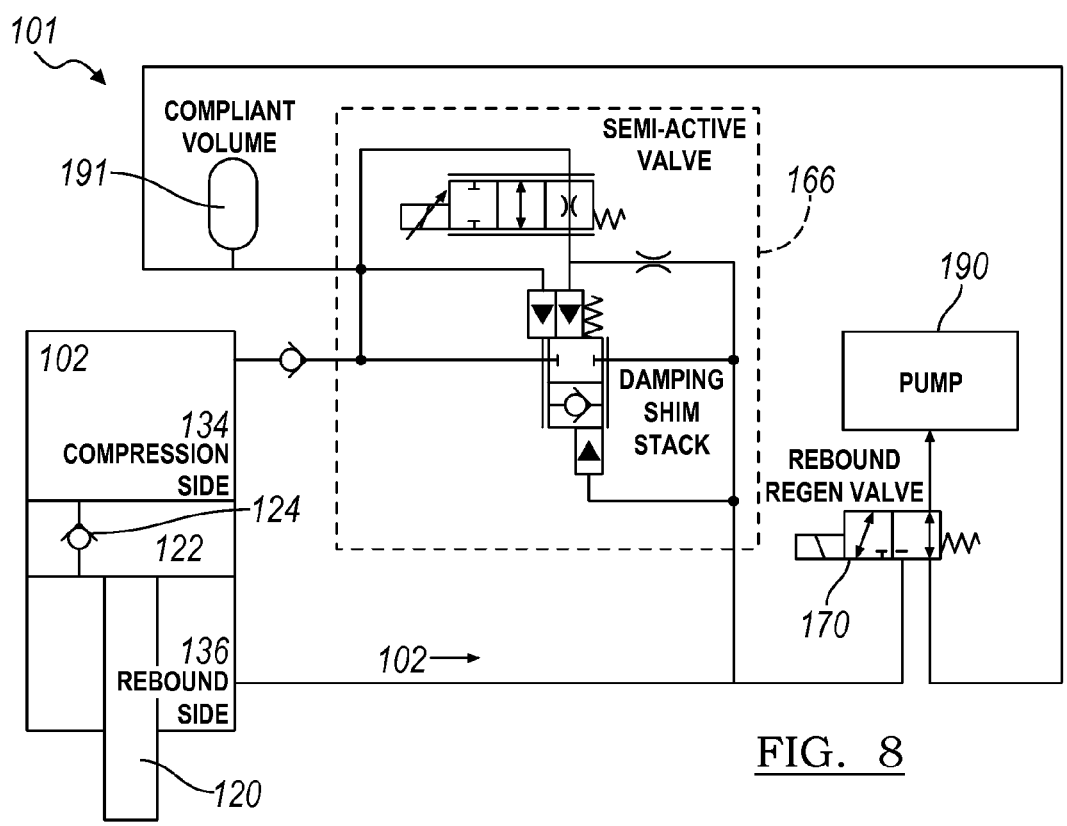
FIG. 8 is a schematic representation of the regenerative suspension strut system embodiment.

As shown in FIG. 8, the suspension strut system 100 may additionally include a regenerative valve and a pump, fluidly coupled to the first fluid path 162, to form a regenerative suspension strut 101. Much like the fourth variation of the damper valve, the regenerative suspension strut 101 functions to regenerate energy from fluid flow within the strut, and is preferably also operable in non-regenerative modes.

The regenerative suspension system 101 may additionally include a third flow path 165 ("regenerative fluid path" or "pump path"), to which the regenerative valve and pump are coupled, wherein the third flow path fluidly couples the intermediary cavity to the reservoir cavity through the valve plate, preferably in parallel with the first flow path 162 134, more preferably sharing an inlet and an outlet with the first flow path 162. The regenerative suspension strut system 101 preferably operates in a first mode that provides a damping force substantially internally within the suspension strut 100 by directing the displaced compressible fluid 102 to a damper valve 166 and a second mode that provides a damping force substantially external to the suspension strut 100 by directing the flow of compressible fluid 102 into the pump 190 to drive the pump 190 and recover energy. In the second mode, the force required to drive the pump 190 provides the damping force. The regenerative suspension strut system 101 may include a third mode where the damping force is provided both through the damper valve 166 and by directing flow of compressible fluid into the pump 190 and/or a fourth mode where the pump 190 pumps fluid 102 back into the suspension strut 100. The damper valve 166 and the regeneration valve 170 may be thought of as operating in parallel such that fluid flow from the strut 100 may flow to either valve depending on the state of the valve. Alternatively, the damper valve 166 and the regeneration valve 170 may be the same physical valve with multiple modes to function to direct fluid into the pump 190, to dampen fluid 102, and/or to both direct fluid into the pump 170 and to dampen the fluid 102. Similarly, to maintain operation of suspension strut 100 when the processor and/or the electronics of the damper valve 166 and/or the regeneration valve 170 fail, the damper valve 166 is preferably of the type of valve where the failure mode still provides substantial damping force (for example, for a damper valve 166 that is a shim stack valve that increases damping force with increasing stiffness, the shim stack preferably fails in a semi-stiff orientation) to the suspension strut 100. However, any other suitable arrangement of the damper valve 166 and the regeneration valve 170 may be used.

Figure 9A:
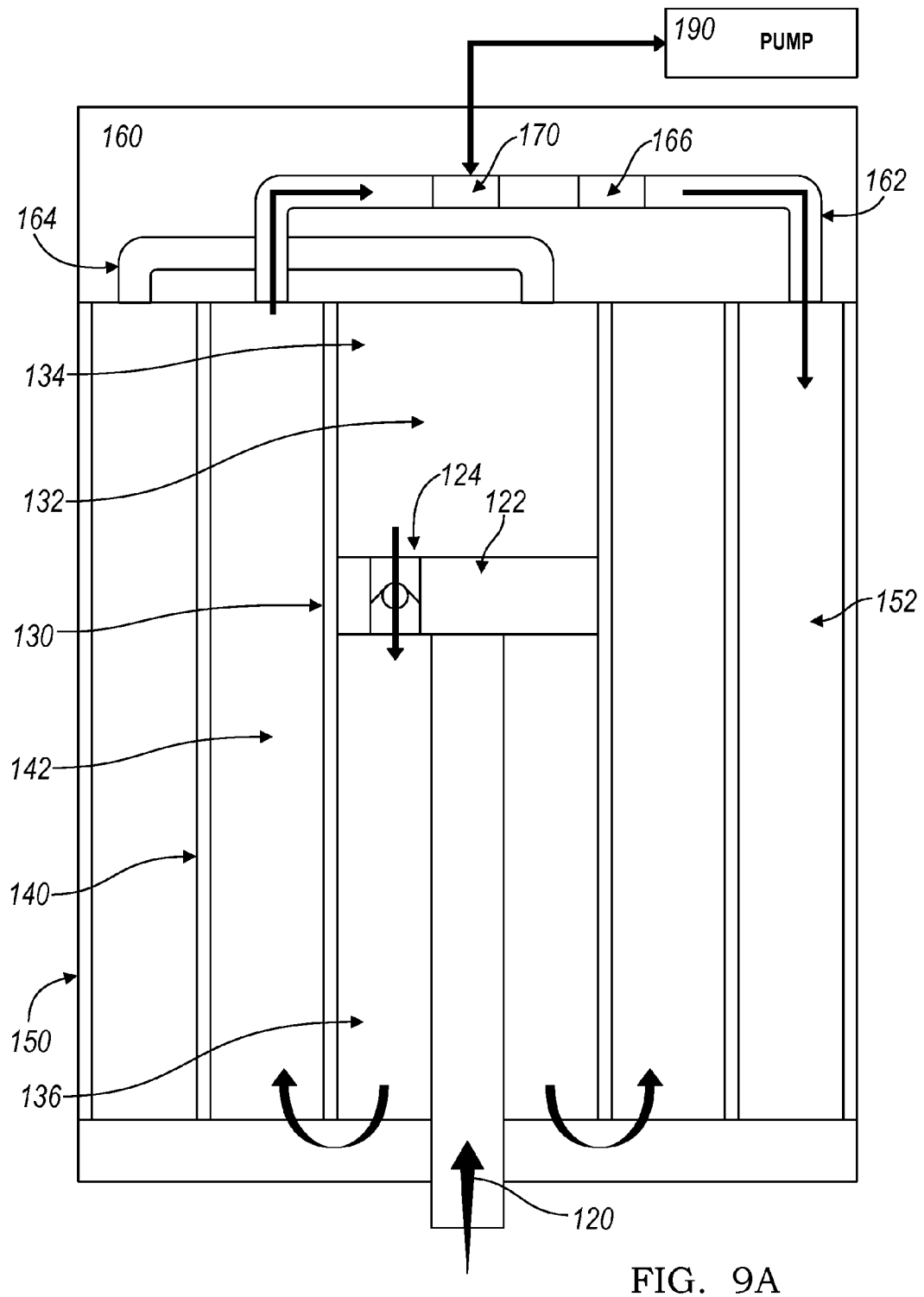
FIGS. 9A and 9B are schematic representations of flow during the compression stroke for a first and a second embodiment of the regenerative suspension strut system embodiment, respectively.
Figure 9B:
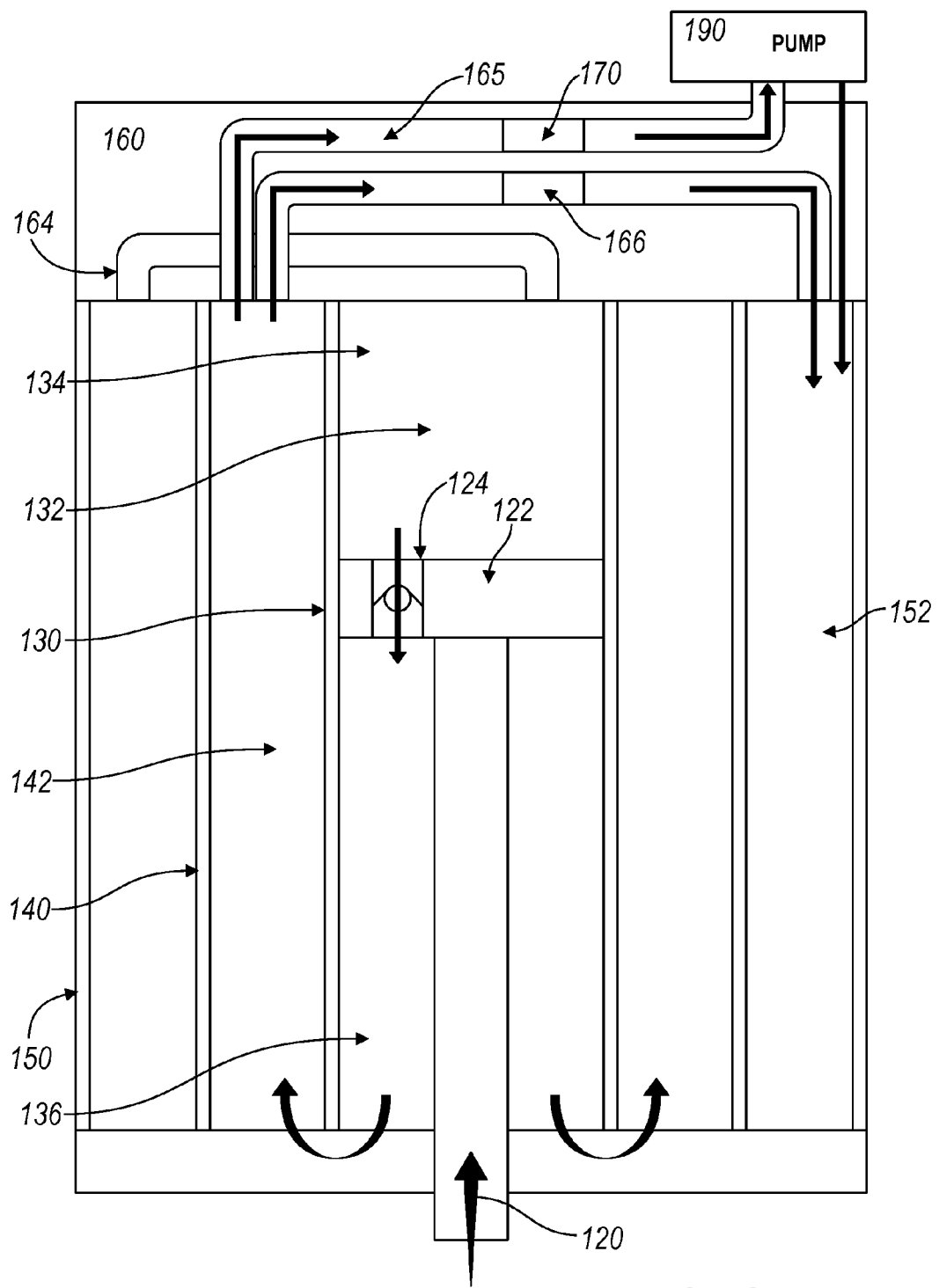
Figure 11A:
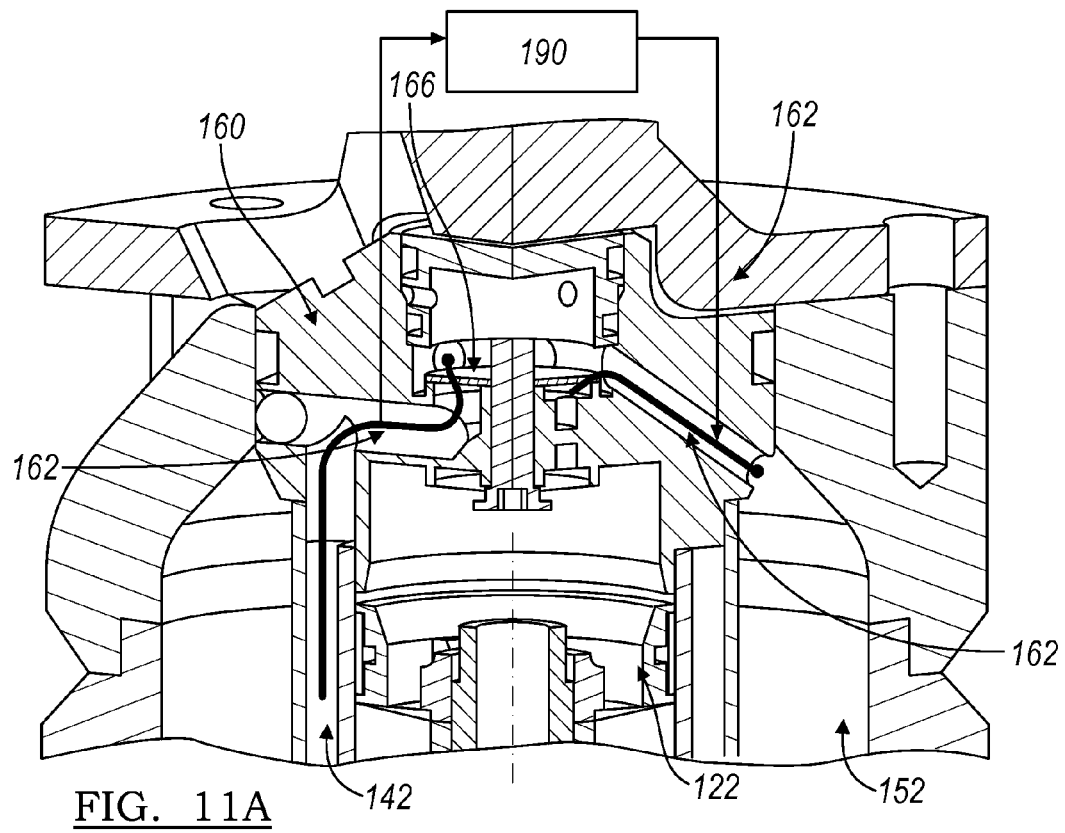
FIGS. 11A and 11B are schematic representations of the valve plate with a passive damper valve in an orthogonal view, taken along Line A-A in FIG. 3A with the damping flow path, and taken along Line B-B in FIG. 3A with the replenishment flow path, respectively.

The flow pattern of the regenerative suspension strut 101 during the compression stroke is preferably substantially similar to that described above. As shown in FIG. 9, during the compression stroke, the displacement rod 120 and cavity piston 122 are displaced toward the valve plate 160. Thus, fluid 102 flows from the first volume 134 of the internal cavity to the second volume 136 through the aperture 124 of the cavity piston 122. Because of the displacement rod 120 that occupies a portion of the volume of the second volume 136 and is coupled to the cavity piston 122, the volume available for the displaced compressible fluid 102 to occupy is less in the second volume 136 than in the first volume 134, and the pressure of the fluid within the second volume 136 increases. A portion of the fluid 102 may be displaced into the intermediary cavity 142 from the internal cavity 132 and, from the intermediary cavity 142, the fluid flows through the first and/or third fluid path 162 of the valve plate 160. In the first mode, the compressible fluid 102 is then directed to the damper valve 166 to apply a damping force on the compressible fluid 102 (shown in FIG. 8). In the second mode, the fluid 102 is directed through the regeneration valve 170 to the pump 190 to drive the pump 190 and to recover energy. Alternately and/or additionally, in the third mode, the fluid 102 is directed to both the damper valve 166 and the regeneration valve 170 (shown in FIGS. 9 and 11A). However, any other suitable arrangement of the flow during the compression stroke may be used.

Figure 10A:
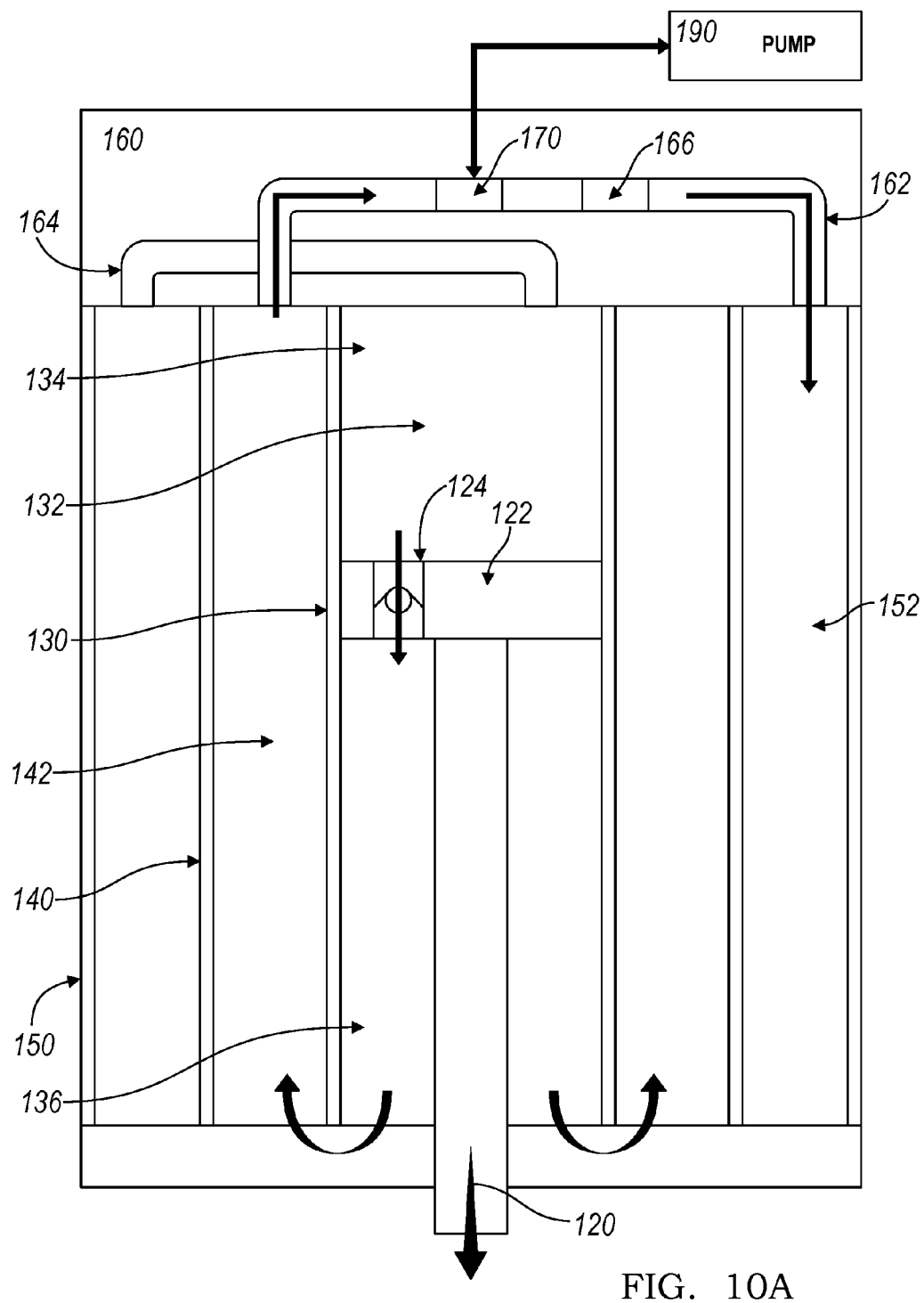
FIGS. 10A and 10B are schematic representations of flow during the rebound stroke of the outflow from the pressure chamber and the rebound flow into the interior cavity, respectively, for the regenerative suspension strut system embodiment.
Figure 10B:
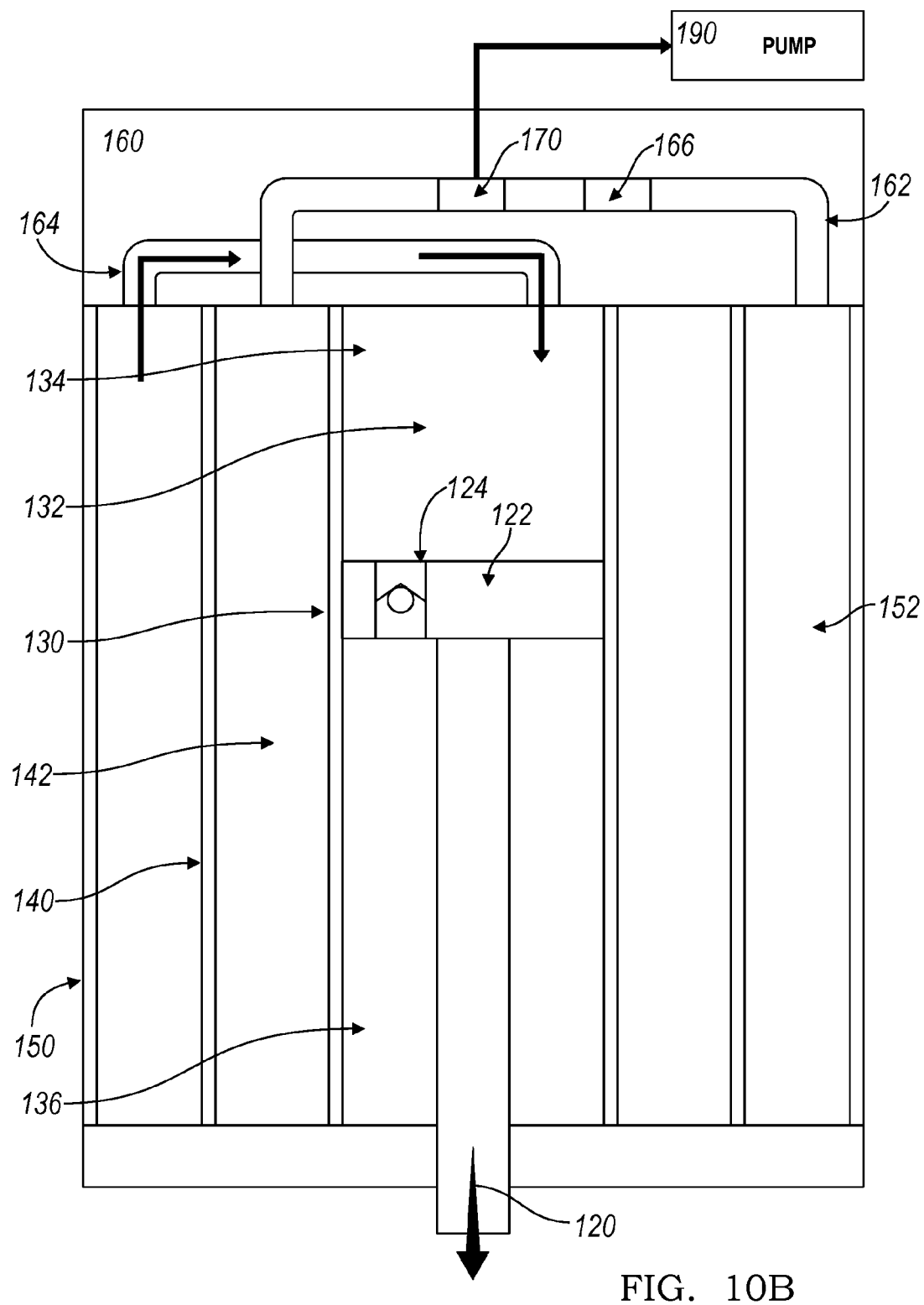
Figure 11B:
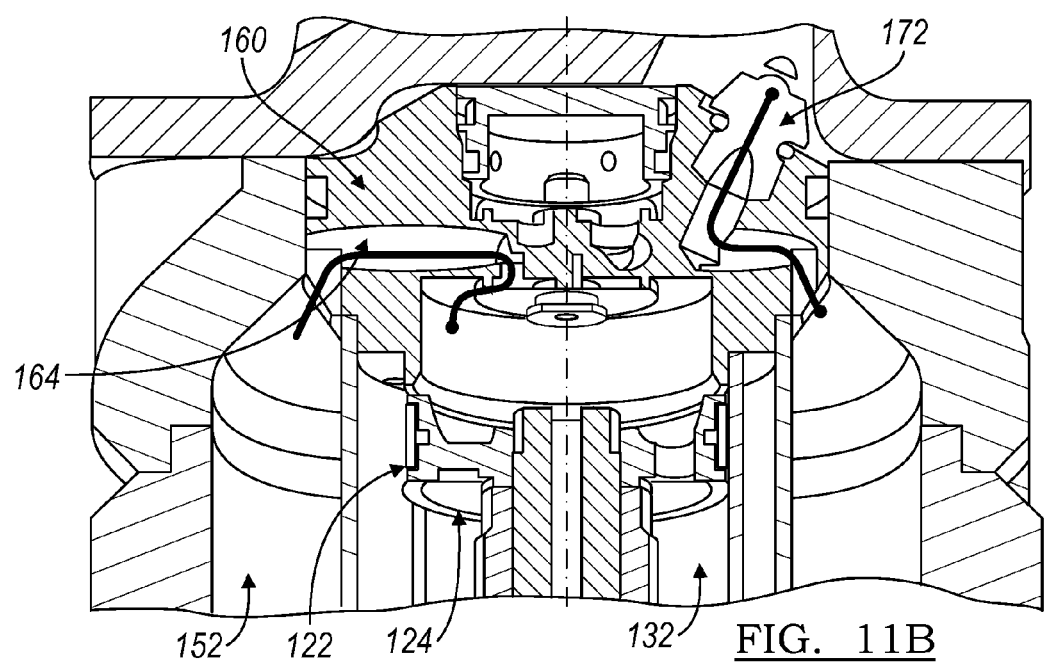

Likewise, the flow pattern of the rebound stroke is substantially similar to that described above. As shown in FIG. 10A, during the rebound stroke, the displacement rod 120 and cavity piston 122 are displaced away from the valve plate 160. The aperture 124 preferably includes an aperture valve that is preferably a one-direction valve that only allows fluid flow from the first volume 134 into the second volume 136 and not from the second volume 136 to the first volume 134. Thus, the fluid pressure within the second volume 136 is again increased and follows a path substantially identical to the one described above for the compression stroke, potentially further driving the pump 190 to recover energy during the rebound stroke. Fluid 102 is directed into the first volume 134 from a compliant volume 191 (as shown in FIG. 8) to prevent aeration within the first volume 134 as the suspension strut 100 extends, as shown in FIG. 10B. This compliant volume 191 may be the reservoir cavity 152, such that fluid 102 from the reservoir cavity 152 is directed through the second fluid path 164 of the valve plate 160 into the internal cavity 132, as shown in FIG. 11B. The valve plate 160 preferably includes a replenishment valve coupled to the second fluid path 164 that is preferably a one-directional valve that opens when the pressure in the first volume is decreased as a result of the rebound stroke.

Figure 12:
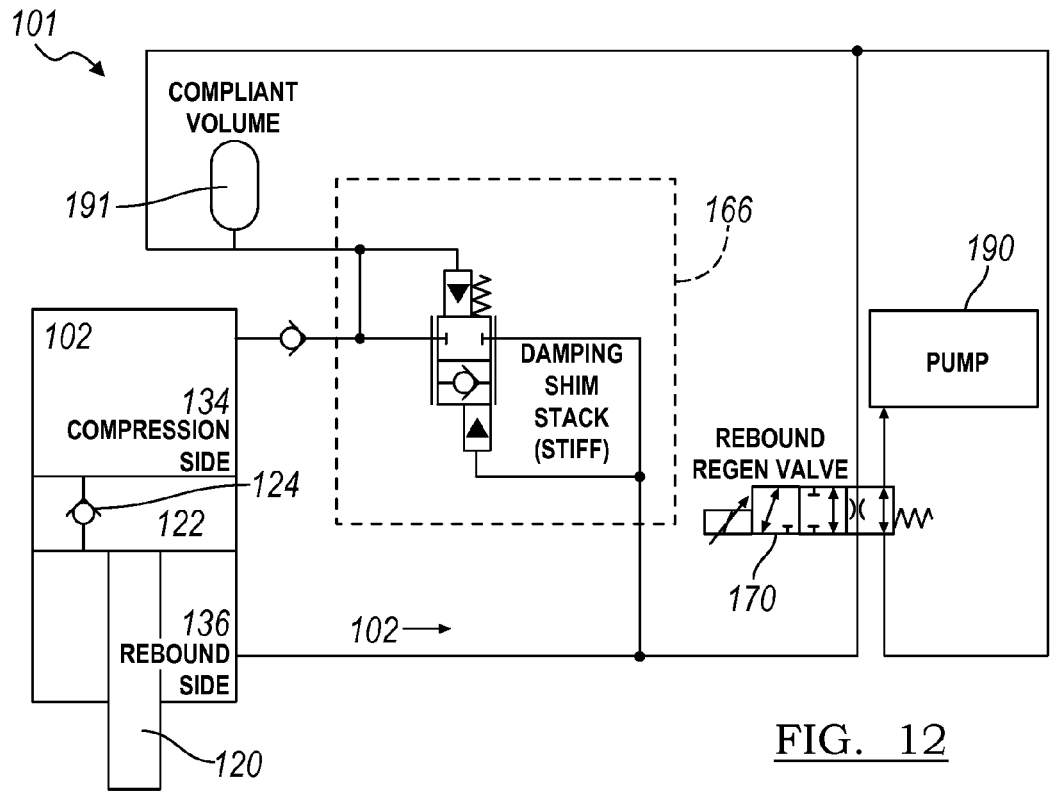
FIGS. 12 and 13 are schematic representations of alternative flow paths of the regenerative suspension strut system of the preferred embodiments.
Figure 13:
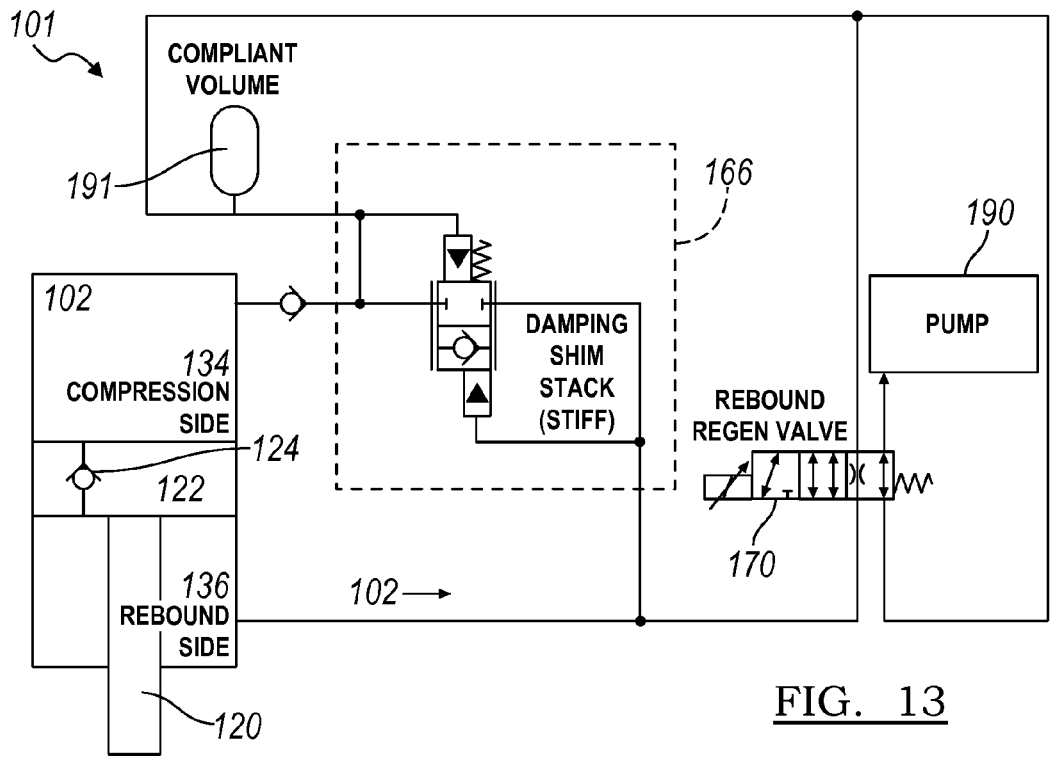

As shown in FIGS. 8, 12 and 13, the regenerative suspension strut system 101 may function to direct the compressible fluid 102 to only the damper valve 166 (the first mode), only the regeneration valve 170 (the second mode), or to both the damper valve 166 and the regeneration valve 170 (the third mode). The regenerative suspension strut system 101 may include a processor that determines the mode depending on the use scenario, the user preferences, and/or any other suitable factor. In a first example, directing fluid through the regeneration valve 170 and into the pump 160 to drive the pump may provide a substantially slower damping response than directing fluid into the damper valve 166. In this first example, when the processor detects a maneuver of the vehicle that requires a faster suspension response, for example, during a fast turn or a substantial bump in the road, the processor may select to operate in the first mode. In a second example, a user may select to operate in the first mode because of the increased responsiveness of the suspension system. For example, the user may plan on driving quickly on mountain roads that include a substantial number of turns. In a third example, the user may know that the road ahead contains a substantial amount of irregularities, for example, an unpaved road. Because of the high number of irregularities, the instances in which energy may be recovered from the suspension system may be high and the user may select the second mode. In a fourth example, the user may select a "fuel economy" mode, which instructs the processor to put a preference on utilizing the second mode. In this example, the user does not instruct a particular mode to operate in, but instructs the processor to prioritize one mode over another and allows the processor to determine the appropriate mode based on the driving scenario. In a fifth example, the processor may select to operate in the fourth mode for increased flexibility where flow is directed to both the damper valve 166 and the regeneration valve 170. In this example, the processor may function to determine the percentage of fluid that is directed to the damper valve 166 and to the regeneration valve 170. For example, the amount of damping force that is provided by the pump 190 may be an amount that is determined by the characteristic of the pump 190 (such as the initial starting pressure necessary). If an increased damping force is necessary, the processor may determine to route more fluid to the damper valve 166. Similarly, the because the damper valve 166 and the pump 160 may be thought of as providing damping force in parallel to the suspension system, the processor may determine a desired amount of damping force and evaluate a percentage flow combination between the damper valve 166 and pump 160 to achieve the desired damping force. In a sixth example, the processor may detect that the pump 190 is malfunctioning and may determine to direct all fluid flow into the damper valve 166. However, any other suitable selection of the operation modes of the regenerative suspension strut system 101 may be used.

As described above, the pressure in the compressible fluid 102 used to drive the pump 190. However, energy is used to direct fluid 102 back into the first volume 134 to replenish the volume in the first volume 134 during the rebound stroke. To improve the fuel economy of the vehicle, the pressure at which fluid 102 is directed back into the first volume 134 is preferably substantially less than the pressure of the fluid 102 used to drive the pump 190, which results in a net positive energy recovery in the regenerative suspension strut system 101. The rate and/or pressure at which the fluid 102 is directed back into the first volume 134 during the rebound stroke is preferably actively controlled to increase energy efficiency. Similarly, the rate and/or pressure at which the fluid 102 is displaced from the second volume 126 is preferably also actively controlled to balance with the pressure of fluid injected into the first volume 124. In typical suspension strut systems, the rebound stroke is passive and is substantially dependent on the type of road irregularity, for example, the shape of the bump on the road. In other words, energy that could have been captured from the compression of the suspension due to the bump in the road is used in the uncontrolled retraction of the suspension after the bump. By substantially controlling the rebound stroke through controlling the rate and/or pressure at which fluid 102 is injected into the first volume 134 and/or through controlling the rate and/or pressure at which fluid 102 is displaced from the second volume 136, energy recovery in the regenerative suspension strut system 101 may be substantially improved over a typical suspension system. This control may be obtained by controlling the fluid flow rate with the pump 190, wherein the pump 190 controls fluid flow into the first volume 134 indirectly by controlling the fluid ingress into the reservoir cavity. Alternately, the pump 190 may be directly coupled to the first volume 134, wherein the valve plate further includes a fourth flow path coupling the pump outlet to the first volume 134 and a second replenishment valve, disposed within the fourth flow path, that allows one-way fluid flow from the pump to the first volume 134.

The pump 190 and damper valve 166 may also function to provide a retractive force on the regenerative suspension strut 101 100. Typical suspension struts are configured to provide a force to suspend the vehicle, or, in other words, a force to extend the strut, and compresses only when there is an external force such as a bump or a turn, and typically do not provide a force to compress the strut, or a retractive force. An active suspension utilizing a single acting cylinder actuator may change the height of the strut, but cannot provide a retractive force unless the strut is fully extended. By facilitating control over the compressible fluid flow to/from the second volume 136, the regenerative suspension strut system 101 is able to provide such a retractive force. As shown in FIGS. 9 and 10, fluid flow from the first volume 134 to the second volume 136 results in an increased pressure within the second volume 136, which is relieved when the fluid 102 is forced through the damper valve 166 and/or pump 190 and damped. However, if an imbalance between the flow rate out through the damper valve 166 and/or the pump 190 and flow rate into the second volume 136 is present, the pressure within the volume of fluid contained within the second volume 136 cannot be relieved, and a force to push the cavity piston 122 back towards the valve plate 160 is present, providing a retractive force. Varying the amount of fluid that is bled through the damper valve 166 and/or directed to pump 190 may control this retractive force. This may be particularly useful if a particular position of the strut that is shorter than the fully extended is desired. An additional retractive force may be achieved by driving the pump 190 to pump fluid into the second volume 136, as shown by the dashed line 4a in FIG. 14. Alternatively, if the pump 190 is driven to pump fluid 102 out of the second volume 136, the retractive force may be decreased to substantially zero and/or a force to extend the suspension strut 100 may result. This pull force may be used to relatively quickly restore the height of the triple tube strut 100 or for any other suitable use. However, any other suitable method to produce a retractive force in the suspension strut 100 may be used.

Figure 14:
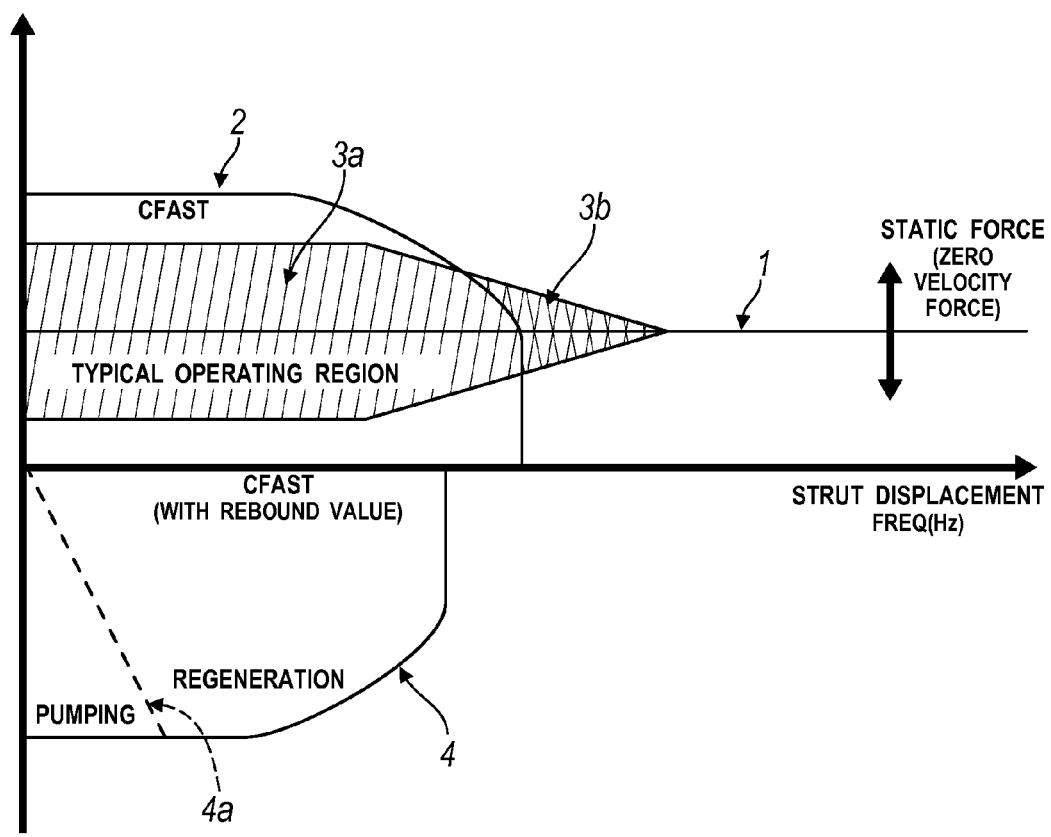
FIG. 14 is a graphical representation of the operating regions of the suspension strut and the energy that may be recovered using the regenerative suspension strut system of the preferred embodiments.

As shown in FIG. 14, the regenerative suspension strut system 101 of the preferred embodiments functions to recover a substantial amount of energy used to operate the triple tube strut 100. The X-axis of FIG. 14 represents displacement frequency seen in the suspension strut 100, for example, from irregularities in the road while the Y-axis represents the force that the suspension strut provides on the vehicle, in other words, the suspending force. Curve 1 represents the equilibrium position of the triple tube strut 100, which changes depending the weight of the vehicle, the payload of the vehicle, or any other suitable parameter. Curve 2 represents the force preferably provided by the regenerative suspension strut system 101 to the vehicle (for example, through a suspension strut 100 of the triple tube strut construction), in other words, the operating region of the suspension strut 100, and Curve 4 represents the retractive force provided by the suspension strut 100, as described above. The shaded region 3 describes the operating region of the suspension strut from which energy may be recovered, in particular, the energy from irregularities on the road. Portion 3A represents the region of irregularities that require suspension response speeds that may be provided by the pump 190 while Portion 3B (cross-hatched) represents the region of irregularities that require a faster response, for example, when the damper valve 166 is used to provide the damping force. In typical driving scenarios, a majority of the irregularities encountered may require suspension response speeds that may be provided by the pump 190. As a result, a substantial portion of the energy from road irregularities may be recovered. The substantially direct linkage between the suspension strut 100 and the pump 190 also decreases the amount of parasitic energy losses within the regenerative suspension strut system 101, which increases the efficiency at which energy may be recovered.

Figure 15:
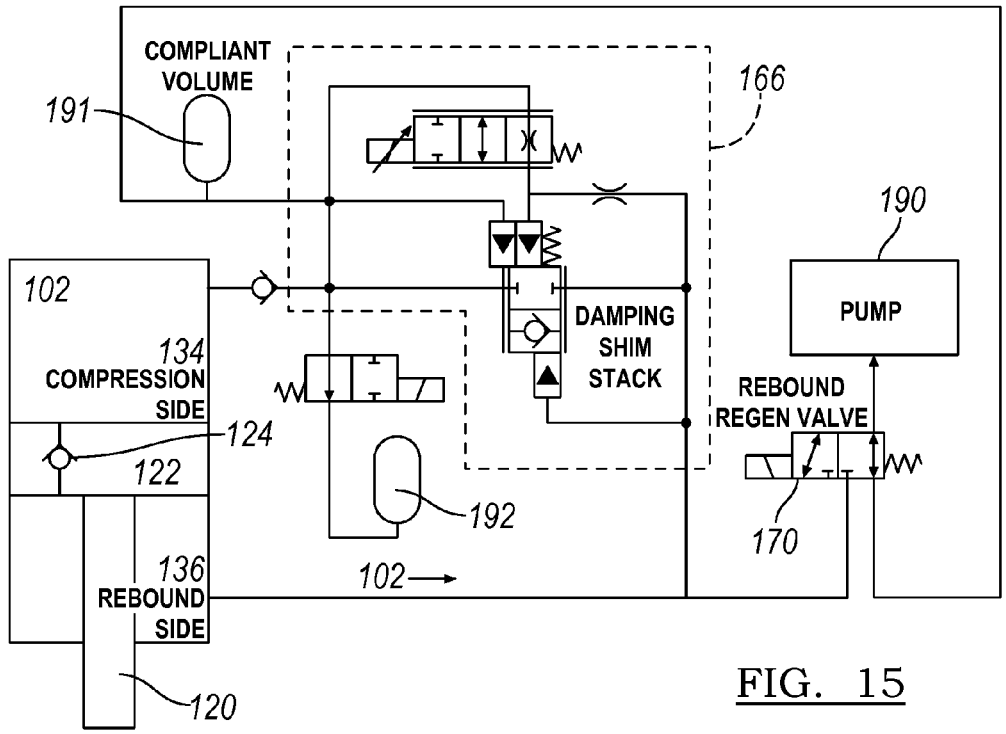
FIGS. 15 and 16 are schematic representations of variations of the regenerative suspension system strut with a second compliant volume and a reservoir, respectively.

As shown in FIG. 15, the regenerative suspension strut system 101 of the preferred embodiments may also include a second compliant volume 192 that is preferably isolated from the system when fluid 102 is actively directed to the pump 190 and may be connected when fluid 102 is not directed to the pump 190. The second compliant volume 192 receives fluid 102 from damper valve 166 to alleviate the pressure of the fluid 102 that would otherwise be used to drive the pump 190. In particular, the suspension strut 100 may be operated at higher pressures when fluid is actively directed to the pump 190 because increased pressure in the fluid 102 is substantially quickly alleviated through the pump 190. However, when fluid is not actively directed to the pump 190, the pressure within the triple tube strut 100 may be too high for passive operation (e.g., the strut 100 may be too stiff) and fluid may then be directed to the second compliant volume 192 to decrease the pressure within the suspension strut 100. This embodiment preferably utilizes the third variation of the damper valve 166 (such as that shown in FIG. 7B), but may alternately utilize any variation of the damper valve 166 as described above. However, any other suitable arrangement of the fluid flow to allow both internal damping through the damper valve 166 and external damping through the pump 190 may be used.

Figure 16:
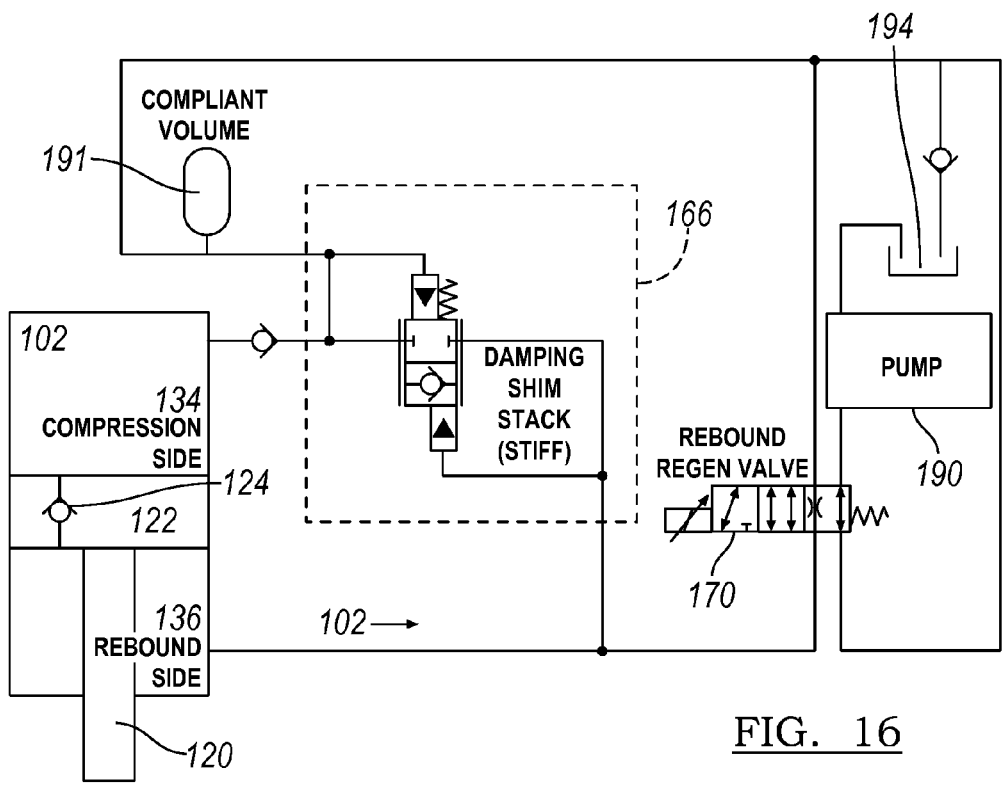

As described above, the pump 190 may function to direct fluid back into the suspension strut 100 to replenish flow within the suspension strut 100. Alternatively, the regenerative suspension strut system 101 may include a reservoir 194, as shown in FIG. 16, from which the suspension strut 100 may draw fluid 102 to replenish the fluid 102 within the suspension strut 100. In this variation, the suspension strut 100 may function substantially similarly to a pump that pumps fluid 102 at substantially high pressures during the compression stroke into the pump 190 to drive the pump 190 and recover energy, and to draw fluid from the reservoir 194 at a substantially lower pressure during the rebound stroke. During the compression stroke, the pump 190 functions to dampen fluid flow to provide a damping force and during the rebound stroke, the reservoir 190 provides fluid at a lower pressure than the fluid used to drive the pump 190 to recover energy, satisfying the pressure relationships for energy recovery as described above. In this variation, the regeneration valve 170 preferably directs fluid 102 during the compression stroke from the suspension strut 100 into the pump 190 and preferably directs fluid 102 from the reservoir 194 into the suspension strut 100 from the reservoir 194. This variation of the regenerative suspension strut system 101 is preferably otherwise substantially similar to the variations as described above.

As a person skilled in the art will recognize from the previous detailed description and from the figures and claims, modifications and changes can be made to the preferred embodiments of the invention without departing from the scope of this invention defined in the following claims.

We claim:
1. A strut system comprising:
a fluid;
a strut comprising:
an inner tube defining an inner cavity, the inner cavity containing a portion of the fluid;
a secondary tube encircling at least a portion of the inner tube, the secondary tube cooperatively defining an intermediary cavity with the inner tube, the intermediary cavity containing a second portion of the fluid;
a housing tube encircling at least a portion of the secondary tube, the housing tube cooperatively defining a reservoir cavity with the secondary tube, the reservoir cavity containing a third portion of the fluid;
a piston disposed within the inner tube and separating the inner cavity into a first volume and a second volume, the piston comprising an aperture through a piston thickness, the aperture fluidly connecting the first volume and the second volume;
a one-way aperture valve within the aperture that allows fluid flow from the first volume to the second volume;
a valve plate coupled to the strut, the valve plate including:
a damping flow path fluidly coupling the intermediary cavity to the reservoir cavity;
a replenishment flow path fluidly coupling the reservoir cavity to the inner cavity;
a damper valve within the damping flow path that damps fluid flowing therethrough; and
a replenishment valve within the replenishment flow path that allows fluid flow from the reservoir cavity to the inner cavity.
2. The strut system of claim 1, wherein the secondary tube is coaxially arranged relative to the inner tube.
3. The strut system of claim 1, wherein the fluid comprises a compressible fluid.
4. The strut system of claim 1, wherein the inner tube comprises apertures through a wall of the inner tube.
5. The strut system of claim 1, wherein the damper valve comprises an active valve.
6. The strut system of claim 5, wherein the damper valve comprises a solenoid-controlled valve.
7. The strut system of claim 1, wherein the damper valve further comprises an actuator configured to adjust a damping force of the damper valve based on an external force applied to the actuator.
8. The strut system of claim 7, wherein the actuator is configured to increase the damping force in response to an increase in the applied external force.

9. The strut system of claim 8, wherein the actuator comprises an actuator piston coupled to the damper valve, the actuator piston configured to apply an adjusting force to the damper valve based on the applied external force.

10. A strut system comprising:
a strut comprising:
- a primary tube defining a first cavity;
- a piston disposed within the primary tube, the piston separating the first cavity into a first volume and a second volume, the piston defining an aperture fluidly connecting the first volume with the second volume;
- an aperture valve within the aperture configured to permit fluid flow from the first volume to the second volume;
an intermediary vessel;
a reservoir vessel;
a damping flow path fluidly intermediary vessel to the reservoir vessel;
a replenishment flow path fluidly coupling the reservoir vessel to the first cavity;
a damper valve within the damping flow path configured to damp fluid flowing therethrough; and
a replenishment valve within the replenishment flow path configured to control fluid flow from the reservoir vessel to the first cavity; and
a pump having an inlet fluidly coupled to the reservoir vessel and an outlet fluidly coupled to the inner cavity, wherein the pump is operable between:
- a recovery mode that recovers energy from and damps fluid flowing therethrough; and
- a pumping mode that pumps fluid from the reservoir volume into the first volume.

11. The system of claim 10, wherein the strut comprises the intermediary vessel, wherein the strut further comprises a secondary tube encircling the primary tube, wherein the intermediary vessel is cooperatively defined by the secondary tube and the primary tube.

12. The system of claim 11, wherein the primary tube comprises apertures extending through a wall of the primary tube.

13. The system of Claim 10, wherein the reservoir vessel is external the strut.

14. The system of claim 10, further comprising a regeneration valve that controls fluid flow to the pump, wherein the regeneration valve is operable between:
- a closed mode that prevents fluid flow to the pump; and
- an open mode that permits fluid flow to the pump.

15. The system of claim 10, wherein the damper valve comprises an electronically controlled valve.

16. The system of claim 15, wherein the damper valve comprises a solenoid-operated valve.

17. The system of claim 10, wherein the damper valve further comprises an actuation piston configured to apply an adjustable pressure to the damper valve that changes the damping force of the damper valve in response to an applied external force on the actuation piston.

18. The system of claim 10, further comprising a fluid cooperatively retained by the primary tube, reservoir vessel, and intermediary vessel.

19. The system of claim 10, further comprising a compressible fluid.

* * * * *